US008771189B2

(12) United States Patent
Ionasec et al.

(10) Patent No.: US 8,771,189 B2
(45) Date of Patent: Jul. 8, 2014

(54) VALVE ASSESSMENT FROM MEDICAL DIAGNOSTIC IMAGING DATA

(75) Inventors: Razvan Ioan Ionasec, Lawrenceville, NJ (US); Ingmar Voigt, Erlangen (DE); Yang Wang, Plainsboro, NJ (US); Bogdan Georgescu, Plainsboro, NJ (US); Helene C. Houle, San Jose, CA (US); Dorin Comaniciu, Princeton Junction, NJ (US); Fernando Vega-Higuera, Erlangen (DE)

(73) Assignees: Siemens Medical Solutions USA, Inc., Malvern, PA (US); Siemens Corporation, Iselin, NJ (US); Siemens Aktiengesellschaft, Munich (DE)

( * ) Notice: Subject to any disclaimer, the term of this patent is extended or adjusted under 35 U.S.C. 154(b) by 724 days.

(21) Appl. No.: 12/702,036

(22) Filed: Feb. 8, 2010

(65) Prior Publication Data

US 2010/0240996 A1    Sep. 23, 2010

Related U.S. Application Data

(60) Provisional application No. 61/260,496, filed on Nov. 12, 2009, provisional application No. 61/161,155, filed on Mar. 18, 2009, provisional application No. 61/161,134, filed on Mar. 18, 2009.

(51) Int. Cl.
    *A61B 8/00*    (2006.01)
(52) U.S. Cl.
    USPC ............................ 600/437; 600/443; 600/450
(58) Field of Classification Search
    USPC .......................................... 600/437, 443, 450
    See application file for complete search history.

(56) References Cited

U.S. PATENT DOCUMENTS 6,106,466 A * 8/2000 Sheehan et al. ............... 600/443

OTHER PUBLICATIONS

R.O. Bonow, B.A. Carabello, K. Chatterjee, A.C.J. de Leon, D.P. Faxon, M.D. Freed, W.H. Gaasch, B.W. Lytle, R.A. Nishimura, P.T. OGara, R.A. ORourke, C.M. Otto, P.M. Shah, and J.S. Shanewise, "Acc/aha 2006 guidelines for the management of patients with valvular heart disease: a report of the american college of cardiology/american heart association task force on practice guidelines (writing committee to develop guidelines for the management of patients with valvular heart disease)," *Circulation*, vol. 114, No. 5, pp. 84-231, 2006.

E. Lansac, K. Lim, Y. Shomura, W. Goetz, H. Lim, N. Rice, H. Saber, and C. Duran, "Dynamic balance of the aortomitral junction," *J Thorac Cardiovasc Surg*, vol. 123, pp. 911-918, 2002.

T. Timek, G. Green, F. Tibayan, F. Lai, F. Rodriguez, D. Liang, G. Daughters, N. Ingels, and D. Miller, "Aorto-mitral annular dynamics," *Ann Thorac Surg*, vol. 76, pp. 1944-1950, 2003.

(Continued)

*Primary Examiner* — Peter Luong

(57) ABSTRACT

Heart valve operation is assessed with patient-specific medical diagnostic imaging data. To deal with the complex motion of the passive valve tissue, a hierarchal model is used. Rigid global motion of the overall valve, non-rigid local motion of landmarks of the valve, and surface motion of the valve are modeled sequentially. For the non-rigid local motion, a spectral trajectory approach is used in the model to determine location and motion of the landmarks more efficiently than detection and tracking. Given efficiencies in processing, more than one valve may be modeled at a same time. A graphic overlay representing the valve in four dimensions and/or quantities may be provided during an imaging session. One or more of these features may be used in combination or independently.

16 Claims, 13 Drawing Sheets

(56) References Cited

OTHER PUBLICATIONS

R.I. Ionasec, Y. Wang, B. Georgescu, I. Voigt, N. Navab, and D. Co-maniciu, "Robust motion estimation using trajectory spectrum learning: Application to aortic and mitral valve modeling from 4d tee," in *Proc. Int'l Conf. Computer Vision*, 2009, p. in progress.

R.I. Ionasec, I. Voigt, B. Georgescu, H. Houle, J. Hornegger, N. Navab, and D. Comaniciu, "Personalized modeling and assessment of the aortic-mitral valve coupling from 4d tee and ct," in *Proc. Int'l Conf. Medical Image Computing and Computer Assisted Intervention*, 2009, p. in progress.

R.I. Ionasec, B, Georgescu, E. Gassner, S. Vogt, O. Kutter, M. Scheuering, N. Navab, and D. Comaniciu, "Dynamic model-driven quantification and visual evaluation of the aortic valve from 4d ct," in *Proc. Int'l Conf. Medical Image Computing and Computer Assisted Intervention*, 2008, pp. 686-694.

Y. Zheng, A. Barbu, B. Georgescu, M. Scheuering, and D. Comaniciu, "Four-chamber heart modeling and automatic segmentation for 3d cardiac ct volumes using marginal space learning and steerable features," *IEEE Trans. on Medical Imaging*, vol. 27, No. 11, pp. 1668-1681, 2008.

E. Votta, F. Maisano, S. Bolling, O. Alfieri, F. Montevecchi, and A. Redaelli, "The geoform disease-specific annuloplasty system: A finite element study," *Ann Thorac Surg*, vol. 84, pp. 92-101, 2007, http://dx.doi.org/10.1016/j.athoracsur.2007.03.040.

X. Kuai, J. Zhang, B. Ren, F. Liu, G. Gong, and Y. Zeng, "Stress analysis on stentless quadrileaflet pericardial mitral valve," *Communications in Numerical Methods in Engineering*, 2007, http://dx.doi.org/10.1002/cnm.999.

F. Veronesi, C. Corsi, L. Sugeng, V. Mor-Avi, E. Caiani, L. Weinert, C. Lamberti, and L.R.M., "A study of functional anatomy of aortic-mitral valve coupling using 3D matrix transesophageal echocardiography," *Circ Cardiovasc Imaging*, vol. 2, No. 1, pp. 24-31, 2009.

T.F Cootes, C.J. Taylor, D.H. Cooper, and J. Graham, "Active shape models-their training and application," *Computer Vision and Image Understanding*, vol. 61, No. 1, pp. 38-59, 1995.

T.F. Cootes, G.J. Edwards, and C.J. Taylor, "Active appearance models," *IEEE Trans. Pattern Anal. Machine Intell.*, vol. 23, No. 6, pp. 681-685, 2001.

Taycher, D. Demirdjian, T. Darrell, and G. Shakhnarovich, "Conditional random people: Tracking humans with CRFs and grid filters," in *Proc. IEEE Conf. Computer Vision and Pattern Recognition*, 2006, pp. 1:222-229.

I. Akhter, Y. Sheikh, S. Khan, and T. Kanade, "Nonrigid structure from motion in trajectory space," in *Advances in Neural Information Processing Systems*, 2008, pp. 41-18.

L. Zelnik Manor and M. Irani, "Temporal factorization vs. spatial factorization," in *Proc. European Conf. Computer Vision*, 2004, pp. II: 434-445.

Z. Tu, "Probabilistic boosting-tree: Learning discriminative methods for classification, recognition, and clustering," in *Proc. Int'l Conf. Computer Vision*, 2005, pp. 1589-1596.

M. Fischler and R. Bolles, "Random sample consensus: A paradigm for model fitting with applications to image analysis and automated cartography," *Comm. of the ACM*, vol. 24, No. 6, pp. 381-395, Jun. 1981.

P. Viola and M. Jones, "Rapid object detection using a boosted cascade of simple features," in *Proc. IEEE Conf. Computer Vision and Pattern Recognition*, 2001, pp. 511-518.

Z. Tu, X.S. Zhou, A. Barbu, L. Bogoni, and D. Comaniciu, "Probabilistic 3D polyp detection in CT images: The role of sample alignment," in *Proc. IEEE Conf. Computer Vision and Pattern Recognition*, 2006, pp. 1544-1551.

T. Zhao and R. Nevatia, "3D tracking of human locomotion: a tracking as recognition approach," in *ICPR*, 2002, pp. 1:546-551.

L. Yang, B. Georgescu, Y. Zheng, P. Meer, and D. Comaniciu, "3d ultrasound tracking of the left ventricle using one-step forward prediction and data fusion of collaborative trackers," in *IEEE Conference on Computer vision and Pattern Recognition*, 2008.

F. Vanden-Eynden, D. Bouchard, I. El-Hamamsy, A. Butnaru, P. Demers, M. Carrier, L. Perrault, J. Tardif, and M. Pellerin, "Effect of aortic valve replacement for aortic stenosis on severity of mitral regurgitation." *Ann Thorac Surg*, vol. 83, pp. 1279-1284, 2007.

A. Agarwal, et al., "Tracking Articulated Motion with Piecewise Learned Dynamical Models," 2004 European Conference on computer Vision; © Springer-Verlag LNCS 2004, pp. 1-12.

R. Ahmad, et al., "Annular Geometry and Motion in Human Ischemic Mitral Regurgitation: Novel Assessment With Three-Dimensional Echocardiogrpahy and Computer Reconstruction," © 2004 by The Society of Thoracic Surgeons, pp. 2064-2068, pp. 2063-2068.

R. Anderson, et al., "Mitral valve repair: critical analysis of the anatomy discussed," © 2007 by the European Association for Cardiothoracic Surgery, pp. 1-10.

Trajectory Triangulation: "3D Reconstruction of Moving Points from a Monocular Image Sequence," *IEEE Transactions on Pattern Analysis and Machine Intelligence*, vol. 22, No. 4, Apr. 2000, pp. 348-357.

F. Bookstein, "Principal Warps: Thin-Plate Splines and the Decomposition of Deformations," *IEEE Transactions on Pattern Analysis and Machine Intelligence*, vol. 11, No. 6, Jun. 1989.

P. Dollár, et al., "Supervised Learning of Edges and Object Bondaries," 2006.

F. Filsoufi, et al., "Physiologic Basis for the Surgical Treatment of Ischemic Mitral Regurgitation," Am Heart Hosp J. 2006; 4: pp. 261-268.

J. Friedman, "Additive Logistic Regression: a Statistical View of Boosting," Aug. 20, 1998, pp. 1-36.

M. Gessat, et al., "A Planning System for Transapical Aortic Valve Implantation," *Medical Imaging 2009*, Proc of SPIE vol. 7261, pp. 1-12.

B. Ginneken, et al., "Active Shape Model Segmentation With Optimal Features,", *IEEE Transactions on Medical Imaging*, vol. 21, No. 8, Aug. 2002, pp. 924-933.

P. Hammer, et al., "Fast Image-based Model of Mitral Valve Closure for Surgical Planning," MICCAI 2008 Workshop Proceedings Computational Biomechanics for Medicine III, Jul. 29, 2008, pp. 15-26.

M. Isard, et al., "Condensation—conditional density propagation for visual tracking," *Int. J. Computer Vision*, in press (1998), pp. 1-36.

Y. Ke, et al., "Efficient Visual Event Detection using Volumetric Features," *Proceedings of International Conference on Computer Vision*, 2005, IRP-TR-05-45.

J. Kwan, et al., "Geometric Differences of the Mitral Apparatus Between Ischemic and Dilated Cardiomyopathy With Significant Mitral Regurgitation," Cardiovascular Imaging Center, Department of Cardiovascular Medicine and Department of Cardiac Surgery, The Cleveland Clinic Foundation, Cleveland, OH, Aug. 29, 2002.

D. Martin, et al., "Learning to Detect Natural Image Boundaries Using Brightness and Texture," Computer Science Division, EECS, U.C. Berkeley, Berkeley, CA 2004.

V. Nkomo, et al., "Burden of valvular heart diseases: a population-based study," Lancet 2006; 368: pp. 1005-1011.

D. Ormoneit, "Learning and Tracking Cyclic Human Motion," 2001.

Polana, et al., "Detection and Recognition of Periodic, Nonrigid Motion," 1997.

J. Song, et al., "Value of Mitral Valve Tenting Volume Determined by Real-Time Three-Dimensional Echocardiography in Patients With Functional Mitral Regurgitation," © 2006 Elsevier Inc., 98: 1088-1093.

T. Timek, et al., "Tachycardia-induced cardiomyopathy in the ovine heart: Mitral annular dynamic three-dimensional geometry," *The Journal of Thoracic and Cardiovascular Surgery*, vol. 125, No. 2, Feb. 2003, pp. 315-324.

C. Tomasi, et al., "Shape and Motion from Image Streams: A Factorization Method—Part 3—Detection and Tracking of Point Features," Technical Report CMU-CS-91-132, Apr. 1991, pp. 1-20.

A. Vahanian, et al., "Guidelines on the management of valvular heart disease," The Task Force on the Management of Valvular Heart Disease of the European Society of Cardiology, *European Heart Journal* (2007) 28, pp. 230-268.

P. Viola, et al., "Detecting Pedestrians Using Patterns of Motion and Appearance," *Proceedings of the Ninth IEEE International Conference on Computer Vision* (ICCV 2003) 2-Volume Set 0-7695-1950-4/03.

(56) References Cited

OTHER PUBLICATIONS

N. Watanabe, et al., "Quantitation of Mitral Valve Tenting in Ischemic Mitral Regurgitation by Transthoracic Real-Time Three-Dimensional Echocardiography," *Journal of the American College of Cardiology*, vol. 45, No. 5, Mar. 1, 2005, pp. 763-769.

Y. Wu, et al., "Tracking Articulated Body by Dynamic Markov Network," *Proceedings of the Ninth IEEE International Conference on Computer Vision* (ICCV 2003) 2-Volume Set 0-7695-1950 Apr. 2003.

H. Yu, et al. "Functional mitral regurgitation in chronic ischemic coronary artery disease: Analysis of geometric alterations of mitral apparatus with magnetic resonance imaging," *The Journal of Thoracic and Cardiovascular Surgery*, vol. 128, No. 4, pp. 543-551.

C. Liu, et al., "Hierarchical Shape Modeling for Automatic Face Localization," *The 7th European Conference on Computer Vision*, pp. 1-16.

Y. Zheng, "Fast Automatic Heart Chamber Segmentation from 3D CT Data Using Marginal Space Learning and Steerable Features."

\* cited by examiner

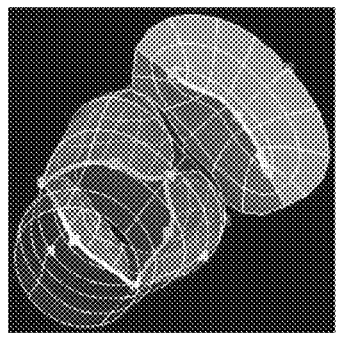
FIG. 1a
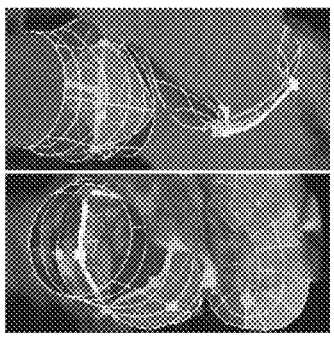
FIG. 1b
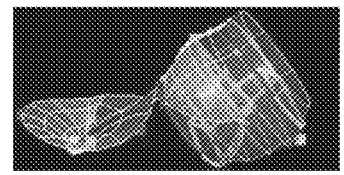
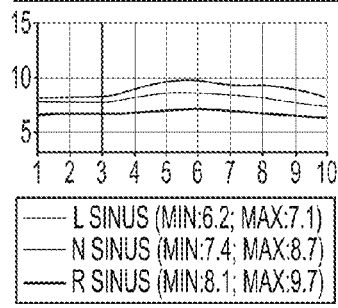
FIG. 1c
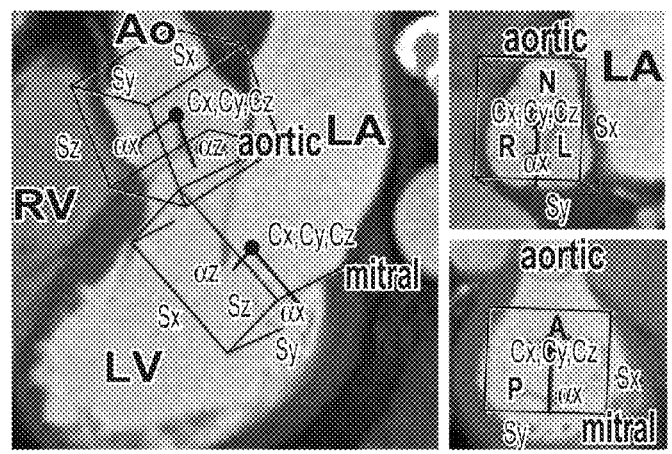
FIG. 3a   FIG. 3b

VALVE ASSESSMENT FROM MEDICAL DIAGNOSTIC IMAGING DATA

RELATED APPLICATIONS

The present patent document claims the benefit of the filing dates under 35 U.S.C. §119(e) of Provisional U.S. Patent Application Ser. Nos. 61/260,496, filed Nov. 12, 2009, 61/161,155, filed Mar. 18, 2009, and 61/161,134, filed Mar. 18, 2009, which are hereby incorporated by reference.

BACKGROUND

The present embodiments relate to medical diagnostic imaging or quantification. In particular, assessment of heart valves is performed from medical diagnostic imaging data.

Valvular surgery accounts for up to 20% of all cardiac procedures in the United States and is applied in nearly 100,000 patients every year. Yet, with an average cost of $120,000 and 5.6% in hospital death rate, valve operations are expensive and risky cardiac interventions. Aortic and mitral valves are most commonly affected, cumulating in 64% and 15%, respectively of all valvular heart disease (VHD) cases.

The heart valves play a key role in the cardiovascular system by regulating the blood flow inside the heart chambers and human body. In particular, the aortic and mitral valves execute synchronized rapid opening and closing movements to govern the fluid interaction in between the left atrium (LA), left ventricle (LV) and aorta (Ao).

Congenital, degenerative, structural, infective or inflammatory diseases can provoke dysfunctions, resulting in stenotic and regurgitant valves. The blood flow is obstructed or, in case of regurgitant valves, blood leaks due to improper closing. Both conditions may greatly interfere with the pumping function of the heart, causing life-threatening conditions. Severe cases require valve surgery, while mild to moderate cases benefit from accurate diagnosis and long-term medical management. Precise morphological and functional knowledge about the aortic-mitral apparatus is important for diagnosis, therapy-planning, surgery or percutaneous intervention as well as patient monitoring and follow-up.

Non-invasive investigations are based on two-dimensional images, user-dependent processing and manually performed, potentially inaccurate measurements. Imaging modalities, such as Cardiac Computed Tomography (CT) and Transesophageal Echocardiography (TEE), enable for dynamic four dimensional scans of the beating heart over the whole cardiac cycle. Such volumetric time-resolved data encodes comprehensive structural and dynamic information. However, the four dimensional scans are rarely exploited in clinical practice due to data size and complexity. Perceiving the valve operation is difficult.

Diagnosis may be assisted by modeling. Dynamic model estimation determines patient specific parameters from volume scan data. Modeling may be approached in two steps—object delineation and motion estimation.

For object delineation, approaches may be based on active shape models (ASM), active appearance models (AAM) or de-formable models. These methods often involve semi-automatic inference or require manual initialization for object location. Discriminative learning methods may efficiently solve localization problems by classifying image regions as containing a target object. This learning-based approach may be applied to three-dimensional object localization by introducing an efficient search method referred to as marginal space learning (MSL). To handle the large number of possible pose parameters of a 3D object, an exhaustive search of hypotheses is performed in sub-spaces with gradually increased dimensionality.

For motion estimation in time dependent four-dimensional problems, tracking methods have been used. To improve robustness, many tracking algorithms integrate key frame detection. The loose coupling between detector and tracker often outputs temporally inconsistent results.

Trajectory-based features have also increasingly attracted attention in motion analysis and recognition. The inherent representative power of both shape and trajectory projections of non-rigid motion are equal, but the representation in the trajectory space may significantly reduce the number of parameters to be optimized. This duality has been exploited in motion reconstruction and segmentation of structure from motion. In particular, for periodic motion, frequency domain analysis shows promising results in motion estimation and recognition.

The majority of cardiac models focus on the representation of the left (LV) and the right ventricle (RV). More comprehensive models include the left (LA) and right atrium (RA), ventricular outflow tracts (LVOT and RVOT), or the aorta (Ao) and pulmonary trunk (PA). Nevertheless, the models do not explicitly model the aortic or mitral valves. Existent valve models are mostly generic and used for hemodynamic studies or analysis of various prostheses rather than being patient specific. A model of the mitral valve used for manual segmentation of TEE data has been proposed. The model includes only the mitral valve annulus and closure line during systole, so is both static and simple. A representation of the aortic-mitral coupling has been proposed. This model is dynamic but limited to only a curvilinear representation of the aortic and mitral annuli. Due to the narrow level of detail and insufficient parameterization, none of the existent valve models are applicable for comprehensive patient-specific modeling or clinical assessment.

BRIEF SUMMARY

By way of introduction, the preferred embodiments described below include methods, computer readable media and systems for assessing heart valve operation with medical diagnostic imaging data. To deal with the complex motion of the passive valve tissue, a hierarchal model is used. Rigid global motion of the overall valve, non-rigid local motion of landmarks of the valve, and surface motion of the valve are modeled sequentially. For the non-rigid local motion, a spectral trajectory approach is used in the model to determine location and motion of the landmarks more efficiently than detection and tracking. Given efficiencies in processing, more than one valve may be modeled at a same time. A graphic overlay representing the valve in four dimensions and/or quantities may be provided during an imaging session. One or more of these features may be used in combination or independently.

In a first aspect, a method is provided for assessing heart valve operation with medical diagnostic imaging data. A first location of a heart valve is estimated from application of the medical diagnostic imaging data to a global location model. The first location is within a volume represented by the medical diagnostic imaging data. A second location of a landmark of the heart valve relative to the heart valve is estimated. The estimating of the second location is a function of the estimated first location. A surface of the heart valve is estimated as a function of the estimated second location of the landmark. An image representing the heart valve is displayed. The image is a function of the surface.

In a second aspect, a computer readable storage medium has stored therein data representing instructions executable by a programmed processor for assessing heart valve operation with medical diagnostic imaging data. The storage medium includes instructions for determining Fourier components of motion of non-linear valve motion of a heart valve from the medical diagnostic imaging data, the medical diagnostic imaging data representing a sequence of volumes including the heart valve, inverse transforming the Fourier components, the inverse transforming providing trajectories of a landmark of the heart valve, the trajectories comprising motion of the landmark over time, ranking the trajectories with a machine learnt probabilities, and selecting a highest ranked trajectory.

In a third aspect, a system is provided for assessing heart valve operation with medical diagnostic ultrasound data. An ultrasound scanner is configured to scan a heart volume of a patient. The scan provides the medical diagnostic ultrasound data representing the heart volume at different times as a sequence. A processor is configured to detect, as a function of application of the medical diagnostic imaging data to a machine-learnt probabilistic model, valve motion in the sequence from the medical diagnostic imaging data. The valve motion is passive motion, and the detection occurs during the scan. A display is configured to generate a visualization of the valve motion through the sequence. The visualization is generated during a same examination session as the scan.

In a fourth aspect, a computer readable storage medium has stored therein data representing instructions executable by a programmed processor for assessing heart valve operation with medical diagnostic imaging data. The storage medium includes instructions for estimating heart valve shape or orientation at a plurality of different times through a sequence for each of at least two heart valves, the estimating being from medical diagnostic imaging data representing a heart volume of a patient over at least a portion of a heart cycle, and calculating a quantity as a function of the heart valve shape or orientation for both of the at least two heart valves.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

FIG. 1 is an example illustration of a medical image of patient-specific aortic and mitral valve models;

FIG. 3 is an example illustration of a medical image of a heart valve with a global segmentation;

DETAILED DESCRIPTION OF THE DRAWINGS AND PRESENTLY PREFERRED EMBODIMENTS

Figure 2:
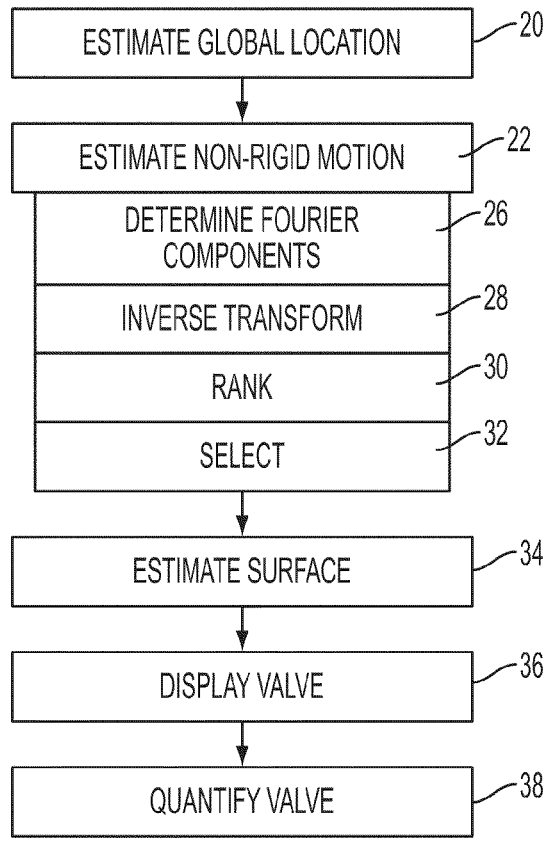
FIG. 2 is a flow chart diagram of embodiments of methods for assessing heart valve operation with medical diagnostic imaging data.

A patient-specific model of the aortic and mitral valves is automatically estimated from volumetric sequences. As decisions in cardiology increasingly rely on non-invasive methods, fast and precise image processing tools may assist analysis workflow. An automatic system for patient specific modeling and quantification of the left heart valves is provided. The modeling operates on cardiac computed tomography (CT) or ultrasound (e.g., transesophageal echocardiogram (TEE)) data. Robust algorithms, based on discriminative learning, are used to estimate patient specific parameters from sequences of volumes covering a cardiac cycle.

The joint valve model includes a physiologically-driven parameterization to represent the full morphological and dynamical aspects of the aortic-mitral apparatus. It also introduces a complete framework for patient-specific parameter estimation from CT and TEE data. Moreover, a model-based valve quantification methodology is presented along with extensive clinical experiments.

The robust conversion of four dimensional CT or TEE data into relevant morphological and functional quantities comprises three aspects: physiological modeling, patient-specific model estimation, and model-driven quantification. The aortic-mitral coupling is represented through a mathematical model sufficiently descriptive and flexible to capture complex morphological, dynamic and pathological variation. It includes all major anatomic landmarks and structures and likewise it is hierarchically designed to facilitate automatic estimation of its parameters. This holistic representation is hierarchically defined on three abstraction levels: global location and rigid motion model, non-rigid landmark motion model, and comprehensive aortic-mitral model. The rough location and cardiac motion is computed applying marginal space learning. The rapid and complex motion of the valves, represented by anatomical landmarks, is estimated using a trajectory spectrum learning algorithm. The obtained landmark model guides the fitting of the full physiological valve model, which is locally refined through learned boundary detectors.

Robust machine-learning algorithms process the four-dimensional data coming from the medical scanners and estimate patient-specific models of the valves. FIG. 1 shows an example mesh overlay provided for imaging of the arotic-mitral valve combination. The valves may be viewed from different directions for assessment. Quantification based on the identification of the valve locations, sizes, motion, orientation, or operation may be output. As a result, a wide-ranging automatic analysis can be performed to measure relevant morphological and functional aspects of the subject valves.

Measurements computed from the aortic mitral representation support an effective morphological and functional clinical evaluation. Extensive experiments on heterogeneous data set, cumulated to 1516 TEE volumes from 65 4D TEE sequences and 690 cardiac CT volumes from 694D CT sequences, demonstrated a speed of 4.8 seconds per volume and average accuracy of 1.45 mm with respect to expert defined ground truth. Additional clinical validations show the quantification precision to be in the range of inter-user variability.

Overall, a comprehensive physiologically-driven model of the aortic and mitral valves captures the full morphology and dynamics as well as pathologic variations. Valve model parameters are estimated from four-dimensional CT or TEE data. Morphological quantification and measurement of dynamic variations over the entire cardiac cycle are supported. Simultaneous analysis of the aortic-mitral complex is provided for concomitant clinical management and in-depth understanding of the reciprocal functional influences.

FIG. 2 shows a method for assessing heart valve operation with medical diagnostic imaging data. The method is implemented by a medical diagnostic imaging system, a review station, a workstation, a computer, a PACS station, a server, combinations thereof, or other device for image processing medical ultrasound data. For example, the system or computer readable media shown in FIG. 18 implements the method, but other systems may be used.

The method is implemented in the order shown or a different order. Additional, different, or fewer acts may be performed. For example, acts 26-32 are not provided. As another example, acts 26-32 are provided without other acts. In another example, acts 36 or 38 are provided using other modeling of the valves.

The acts are performed in real-time, such as during scanning. The user may view images of act 36 while scanning to acquire another dataset representing the volume. The images may be associated with previous performance of acts 20-38 in the same imaging session, but with different volume data. For example, acts 20-38 are performed for an initial scan and for subsequent scans during the same imaging session or while the patient is still at the medical facility. Measurements and/or images of automatically detected anatomy may be provided in seconds, such as 10 or fewer seconds.

The modeling and patient-specific fitting of the model may be performed for any valve or heart valve. In one embodiment, a single heart valve is identified and parameterized. In other embodiments, more than one heart valve is identified and parameterized at a same time or during a same imaging session. For example, the mitral valve and the aortic valve are physiologically modeled.

For patient specific modeling, one or more sets of data are obtained. Ultrasound or computed tomography data is obtained. Any medical imaging modality capable of scanning a volume multiple times during a heart cycle may be used, such as TEE echocardiography. The ultrasound data corresponds to a data set interpolated to a regular 3D grid, displayed images (e.g., detected and scan converted ultrasound data), beamformed data, detected data, and/or scan converted data. The ultrasound data represents a volume or 3D region of a patient. The region includes tissue, fluid or other structures. Different structures or types of structures react to the acoustic energy differently. The shape of a structure or spatial aspect may be reflected in B-mode or harmonic data. The data represents the region of the patient.

For determining the location, shape, motion, size or other characteristic of a heart valve, the valve is modeled generally. The model is fit to patient specific data by estimation. The estimation is performed in sequential stages, such as associated with a hierarchal model. For example, a location of the global valve relative to the volume is estimated, a location in the valve relative to other portions of the valve is then estimated, and a surface of the valve is then estimated. Each stage may use the same or different algorithms. For example, separate machine-learnt algorithms are used.

In one embodiment, a physiological model of the aortic and mitral valves is designed to capture complex morphological, dynamical and pathological variations. The hierarchical definition is constructed on three abstraction levels: global location and rigid motion model, non-rigid landmark motion model, and comprehensive aortic-mitral model. Along with the parameterization, an anatomically driven resampling method to establish point correspondence required for the construction of a statistical shape model is provided. A collision detection and repair algorithm may provide physiological consistency.

Figure 7:
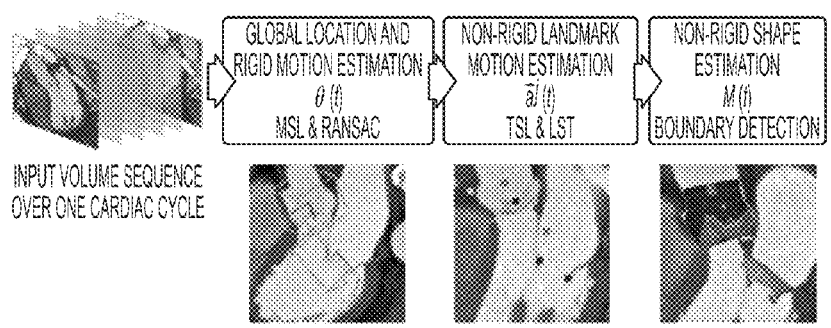
FIG. 7 is a diagram of medical images representing hierarchal model estimation according to one embodiment.

For estimating from the model relative to a particular patient, patient-specific aortic-mitral model estimation is provided. The model parameters are estimated from volumetric sequences (3D+time data) to construct patient-specific aortic-mitral representations. A robust learning-based algorithm, which in concordance with the hierarchical parameterization, includes three stages: global location and rigid motion estimation, non-rigid landmark motion estimation and comprehensive aortic-mitral estimation. FIG. 7 illustrates an example algorithm. Each stage may be implemented differently. In one embodiment, trajectory spectrum learning (TSL) with local-spatio-temporal (LST) features is used for the non-rigid landmark motion estimate. The number of stages may be fewer or more. The same algorithm is used for either ultrasound or computer tomography data. Alternatively, different algorithms are trained for the different types of data.

Any machine training may be used for one or more stages. The machine-trained classifier is any one or more classifiers. A single class or binary classifier, collection of different classifiers, cascaded classifiers, hierarchal classifier, multi-class classifier, model-based classifier, classifier based on machine learning, or combinations thereof may be used. Multi-class classifiers include CART, K-nearest neighbors, neural network (e.g., multi-layer perceptron), mixture models, or others. A probabilistic boosting tree may be used. Error-correcting output code (ECOC) may be used.

The classifier is trained from a training data set using a computer. Any number of expert annotated sets of data is used. For example, about 200 hundred volume sequences representing the heart and including one or more valves are annotated. The annotation indicates valve landmarks and/or surfaces within the volumes. The different anatomies of each volume are annotated. This large number of annotations allows use of a probabilistic boosting tree to learn relevant features over a large pool of 3-D Haar, and/or steerable features. Both features may be efficiently computed and be effective as a feature space for boosting classifiers. Other features may be used. Each classifier uses the data sets and annotations specific to the anatomy being classified.

In one embodiment, the classifier is a knowledge-based probabilistic model, such as marginal space learning using a hierarchical search. A database of known cases is collected for machine learning, providing a database-driven knowledge-based approach. For training data, three-dimensional context information is preserved and guides the detection process. Knowledge is embedded in large annotated data repositories where expert clinicians manually indicate the anatomies and/or measurement indicators for the anatomies. Training and detecting the location of measurement indicators include detecting the associated anatomy since the measurement indicator indicates the anatomy. The detectors are trained on a large number of annotated 3D volumes. The classifier learns various feature vectors for distinguishing between a desired anatomy and information not being detected. In alternative embodiments, the classifier is manually programmed.

For learning-based approaches, the classifier is taught to distinguish based on features. For example, the probability model algorithm selectively combines features into a strong committee of weak learners based on Haar-like local rectangle filters whose rapid computation is enabled by the use of an integral image. Features that are relevant to the anatomies are extracted and learned in a machine algorithm based on the experts' annotations, resulting in a probabilistic model. A large pool of features may be extracted. The training determines the most determinative features for a given classification and discards non-determinative features. Different combinations of features may be used for detecting different anatomies, the same anatomy at different resolutions, and/or the same anatomy associated with different translation, rotation, or scale. For example, different sequential classification stages utilize different features computed from the 3D volume data. Each classifier selects a set of discriminative features that are used to distinguish the positive target from negatives. The features are selected from a large pool of features. The large pool is determined by a programmer or may include features systematically determined.

A tree structure may be learned and may offer efficiency in both training and application. Often, in the midst of boosting a multi-class classifier, one class (or several classes) has been completely separated from the remaining ones and further boosting yields no additional improvement in terms of the classification accuracy. For efficient training, a tree structure is trained. To take advantage of this fact, a tree structure is trained by focusing on the remaining classes to improve learning efficiency. Posterior probabilities or known distributions may be computed, such as by correlating anterior probabilities together.

To handle the background classes with many examples, a cascade training procedure may be used. A cascade of boosted binary-class strong classifiers may result. The cascade of classifiers provides a unified algorithm able to detect and classify multiple objects while rejecting the background classes. The cascade structure corresponds to a degenerate decision tree. Such a scenario presents an unbalanced nature of data samples. The background class has voluminous samples because all data points not belonging to the object classes belong to the background class. Alternatively, the classifiers are sequentially trained without cascade.

The probabilistic boosting tree (PBT) unifies classification, recognition, and clustering into one treatment. A probabilistic boosting tree is learned for each anatomy or stage of interest. The classifier is a tree-based structure with which the posterior probabilities of the presence of the anatomy of interest are calculated from given data. Each detector not only provides a binary decision for a given sample, but also a confidence value associated with the decision. The nodes in the tree are constructed by a combination of simple classifiers using boosting techniques, such as disclosed by Tu, "Probabilistic Boosting-Tree: Learning Discriminative Models for Classification, Recognition, and Clustering," Proc. Intl Conf. on Computer Vision, pp 1589-1596, 2005.

Referring to FIG. 2, a global location is estimated. For example, the location of a heart valve relative to the overall volume is estimated. In one embodiment, the estimation is of a rigid valve structure or bounding box without consideration to non-rigid, localized motion of the heart valve. The global location model is a rigid motion model. The location of the valve relative to the heart is determined.

The estimation is performed by applying patient-specific data representing the volume to a global location model. The global location of both aortic and mitral valves is parameterized through a similarity transformation in the three-dimensional space, illustrated as a bounding box in FIG. 3. A time variable t augments the representation to capture the temporal variation during the cardiac cycle.

$$\theta = \{(c_x, c_y, c_z), (\vec{\alpha}_x, \vec{\alpha}_y, \vec{\alpha}_z), (s_x, s_y, s_z), t\} \quad (1)$$

where $(c_x, c_y, c_z), (\vec{\alpha}_x, \vec{\alpha}_y, \vec{\alpha}_z), (s_x, s_y, s_z)$ are the position, orientation and scale parameters as represented in FIG. 3.

The anatomically-driven definition is provided for each parameter in $\theta$ for one or more valves. The rigid motion is modeled independently for the aortic and mitral valves, but a same model may be used.

The aortic valve connects the left ventricular outflow tract to the ascending aorta and includes the aortic root and three leaflets/cusps (left (L) aortic leaflet, right (R) aortic leaflet and none (N) aortic leaflet). The root extends from the basal ring to the sinutublar junction and builds the supporting structure for the leaflets. These are fixed to the root on a crown-like attachment and can be thought of as semi-lunar pockets. The position parameter $(c_x, c_y, c_z)_{aortic}$ is given by the valve's barycenter, while the corresponding scale $(s_x, s_y, s_z)_{aortic}$ is chosen to comprise the entire underlying anatomy. The long axis $\vec{\alpha}_z$ is defined by the normal vectors to the aortic commissural plane, which is the main axis of the aortic root. The short axis $\vec{\alpha}_x$ is given by the normalized vector pointing from the barycenter $(c_x, c_y, c_z)_{aortic}$ to the interconnection point of the left and right leaflet, the left/right-commissure point. The $\vec{\alpha}_y$ direction is constructed from the cross-product of $\vec{\alpha}_x$ and $\vec{\alpha}_z$.

Located in between the left atrium and the left ventricle, the mitrel valve includes the posterior leaflet, anterior leaflet, annulus and subvalvular apparatus. The latter consists of the chordae tendiae and papillary muscles, which are not explicitly treated in this work. The barycentric position $(c_x, c_y, c_z)_{mitral}$ and scale parameters $(s_x, s_y, s_z)_{amitral}$ are computed from the mitral leaflets. $\vec{\alpha}_z$ is described by the normal vector to the mitral annulus, while $\vec{\alpha}_x$ points from the barycenter $(c_x, c_y, c_z)_{mitral}$ toward the postero-annular midpoint. The parameters of the global location and rigid motion model, as noted above, are described by anatomical landmarks.

Using this mode, the global location of valves for a given patient may be estimated. To estimate, a machine-learnt algorithm is trained. The location and motion parameters $\theta$ are estimated using the marginal space learning (MSL) framework in combination with a Random Sample Consensus (RANSAC). Other machine learning may be used. Given a sequence of volumes I, the task is to find similarity parameters $\theta$ with maximum posterior probability:

$$\arg\max_\theta p(\theta|I) = \arg\max_\theta p(\theta(0),\ldots,\theta(n-1)|I(0),\ldots,I(n-1)) \quad (4)$$

To solve equation (4), the object localization is formulated as a classification problem, and $\theta(t)$ is estimated for each time step t independently from the corresponding volumes I(t). The probability $p(\theta(t)I(t))$ is modeled by a learned detector D, which evaluates and scores a large number of hypotheses for $\theta(t)$. D is trained using the Probabilistic Boosting Tree (PBT), positive and negative samples extracted from the ground-truth, as well as efficient 3D Haar wavelet and steerable features. Other training and/or features may be used.

The object localization task is performed by scanning the trained detector D exhaustively over different hypotheses to find the most plausible values for $\theta(t)$ at each time step t. As the number of hypotheses to be tested increases exponentially with the dimensionality of the search space, a sequential scan in a nine-dimensional, similarity transform, space may be computationally unfeasible. Suppose each dimension in $\theta(t)$ is discretized to n values, the total number of hypotheses is $n^9$ and even for a small n=15 becomes extreme $3.98^{e+10}$. To overcome this limitation, the MSL framework (e.g., translation, translation and orientation, and then translation, orientation and scale) is applied to break the original parameters space $\Sigma$ into subsets of increasing marginal spaces:

$$\Sigma_1 \subset \Sigma_2 \subset \ldots \subset \Sigma_n = \Sigma$$

By decomposing the original search space as follows $$\Sigma_1 = (c_x, c_y, c_z)$$

$$\Sigma_2 = (c_x, c_y, c_z, \vec{\alpha}_x, \vec{\alpha}_y, \vec{\alpha}_z)$$

$$\Sigma_3 = (c_x, c_y, c_z, \vec{\alpha}_x, \vec{\alpha}_y, \vec{\alpha}_z, s_x, s_y, s_z)$$

the target posterior probability can be expressed as:

$$p(\theta(t)|I(t)) = p(c_x, c_y, c_z|I(t))$$

$$p(\vec{\alpha}_x, \vec{\alpha}_y, \vec{\alpha}_z | c_x, c_y, c_z, I(t))$$

$$p(s_x, s_y, s_z | \vec{\alpha}_x, \vec{\alpha}_y, \vec{\alpha}_z, c_x, c_y, c_z, I(t))$$

In practice, one arrangement for MSL sorts the marginal spaces in a descending order based on their variance. Learning parameters with low variance first may decrease the overall precision of the detection. Due to heterogeneity in CT and TEE acquisition protocols and physiological variations of the heart, the highest variance comes from translation followed by orientation and scale. This order is confirmed by our experiments to output the best results.

Instead of using a single detector D, detectors are trained for each marginal space ($D_1$, $D_2$ and $D_3$) and detect by gradually increasing dimensionality. After each stage, only a limited number of high-probability candidates are kept to significantly reduce the search space. In one example embodiment, the 100 highest score candidates are retained in $\Sigma_1$ and 50 in $\Sigma_2$, such that the smallest subgroup which is likely to include the optimal solution is preserved.

$\theta(t)$ hypotheses estimated from each time step t are aggregated to obtain a temporal consistent global location and motion $\theta$ by employing RANSAC. Other formulas may be used. From randomly sampled $\theta$ candidates, the one yielding the maximum number of inliers is picked as the final motion. Inliers are considered within a distance of $\sigma=7$ mm from the current candidate and extracted at each time step t. Other distances and step lengths may be used. The distance measure $d(\theta(t)_1, \theta(t)_2)$ is given by the maximum L1 norm of the standard unit axis deformed by the parameters $\theta(t)_1$ and $\theta(t)_2$, respectively. The resulting time-coherent $\theta$ describes the global location and rigid motion over the entire cardiac cycle.

In act 22 of FIG. 1, a location of a landmark of the heart valve is estimated. The location is relative to the heart valve. The global motion is accounted for such that the landmark estimation corresponds to local motion of the valve itself without motion of the global valve position. The estimating of the landmark location is a function of the estimated global location to better isolate the non-rigid, local motion of the heart valve. The estimate is provided by applying medical diagnostic imaging data for a patient to a trained model.

The location or motion of a plurality of landmarks may be estimated. The aortic and mitral valves execute a rapid opening-closing movement, which follows a complex and synchronized motion pattern. Normalized by the time-dependent similarity transformation (e.g., the estimated global motion), the non-rigid motion is represented through a model of any number, such as eighteen, anatomically-defined landmarks.

Figure 4A:
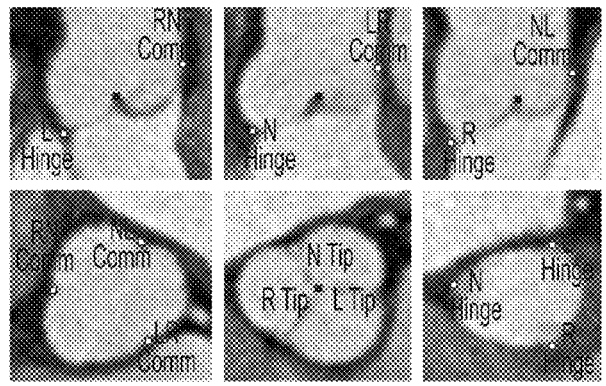
FIG. 4 is an illustration of example landmarks for a heart valve.
Figure 4B:
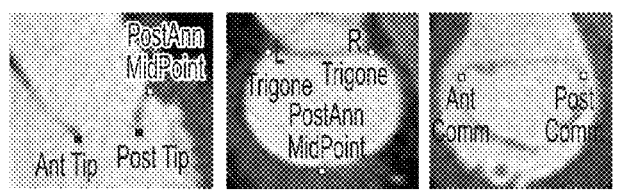
Figure 4C:
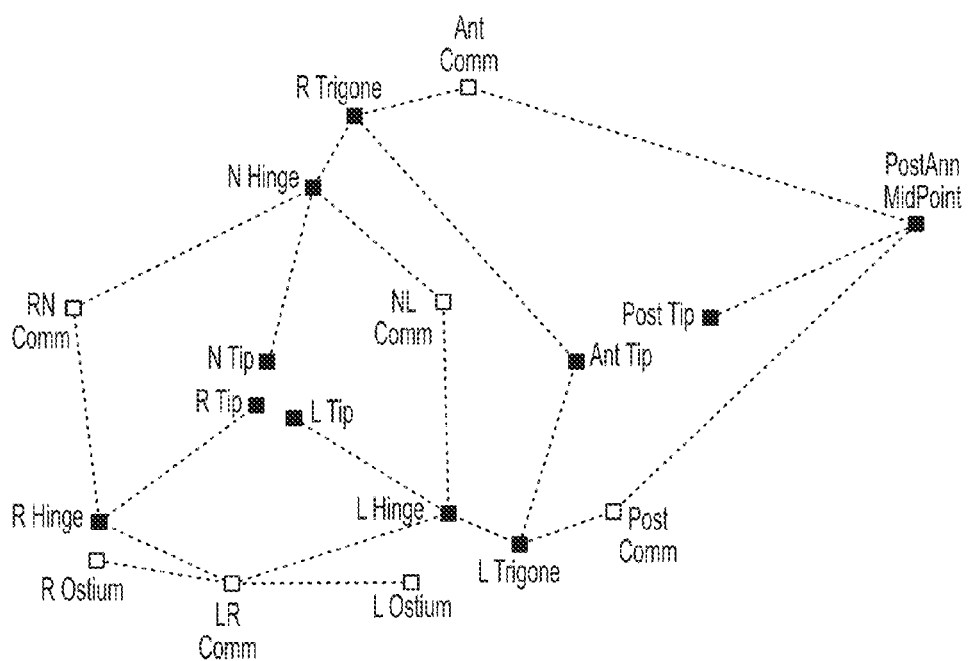

FIG. 4 shows an example of eighteen landmarks in images and as a connected group. Three aortic commissure points, i.e., LR-Comm, NL-Comm and RN-Comm, describe the interconnection locations of the aortic leaflets, while three hinges, i.e., L-Hinge, R-Hinge, and N-Hinge, are their lowest attachment points to the root. For each leaflet of the aortic and mitral valves, the center of the corresponding free-edge is marked by the leaflet tip point: UR/N-Tip tips for aortic valves and Ant/Post-Tip (anterior/posterior) leaflet tips for mitral valves. The two interconnection points of the mitral leaflets at their free edges are defined by the mitral Ant/Post-Comm, while the mitral annulus is fixed by the L/R-Trigone and posteroannular midpoint (PostAnn Midpoint). Finally, the interface between the aorta and coronary arteries is symbolized using the UR-Ostium, the two coronary ostia. Besides the well defined anatomical meaning, the chosen landmarks serve as anchor points for qualitative and quantitative clinical assessment, are robustly identifiable by doctors, and possess particular visual patterns.

Any model may be used. In one embodiment, the motion of each landmark is modeled over time as a trajectory. The model incorporates spectral information, such as Fourier components, for each of the landmarks. A trajectory is determined for each landmark. The motion of each anatomical landmark j can be parameterized by its corresponding trajectory $\alpha^j$ over a full cardiac cycle or over a portion of a cycle. For a given volume sequence I(t), one trajectory $\alpha^j$ is composed by the concatenation of the spatial coordinates:

$$\vec{\alpha}^j = [\vec{\alpha}^j(0), \vec{\alpha}^j(1), \ldots, \vec{\alpha}^j(t), \ldots, \vec{\alpha}^j(n-1)] \quad (2)$$

where $\alpha^j$ are spatial coordinates with $\vec{\alpha}^j(t) \in \square^3$ and t an equidistant discrete time variable t=0, n−1.

The anatomical landmarks are also used to compute the parameters of the global location and rigid motion as follows: $(c_x, c_y, c_z)$ aortic equals the gravity center of the aortic landmarks, except aortic leaflet tips. $\vec{\alpha}_z$ is the normal vector to the LR-Comm, NL-Comm, RN-Comm plane, $\vec{\alpha}_x$ is the unit vector orthogonal to $\vec{\alpha}_z$ which points from $(c_x, c_y, c_z)_{aortic}$ to LR-Comm, $\vec{\alpha}_y$ is the cross-product of $\vec{\alpha}_x$; and $\vec{\alpha}_z \cdot (s_x, s_y, s_z)_{aortic}$ is given by the maximal distance between the center (c $c_x, c_y, c_z)_{aortic}$ and the aortic landmarks, separately along each axes $(\vec{\alpha}_x, \vec{\alpha}_y, \vec{\alpha}_z)$. Analogues to the aortic valve, the barycentric position $(c_x, c_y, c_z)_{mitral}$ is computed from the mitral landmarks, except mitral leaflet tip. $\vec{\alpha}_z$ is the normal vector to the L/R-Trigone, PostAnn Midpoint plane, $\vec{\alpha}_x$ is orthogonal to $\vec{\alpha}_z$ and points from $(c_x,c_y,c_z)_{mitral}$ towards the PostAnn Midpoint. The scale parameters $(s_x,s_y,s_z)_{mitral}$ are defined as for the aortic valve to provide the entire mitral anatomy. Other parameters may be used to define the bounding box or extent of the valve for global motion estimation.

For non-rigid landmark motion estimation, the corresponding model is applied to patient specific data. Based on the determined global location and rigid motion, the trajectory spectrum learning algorithm estimates the non-linear valve movements from volumetric sequences. The objective is to find for each landmark j its trajectory $\vec{\alpha}^j$, with the maximum posterior probability from a series of volumes I, given the rigid motion θ:

$$\arg\max_{\vec{\alpha}^j} p(\vec{\alpha}^j | I,\theta) = \arg\max_{\vec{\alpha}^j} p(\vec{\alpha}^j (0),\ldots,(n-1)|I(0),\ldots,I(n-1),\theta(0),\ldots,\theta(n-1)) \quad (5)$$

While it is difficult to solve equation 5 directly, various assumptions, such as the Markovian property of the motion, may be applied to the posterior distribution over $\vec{\alpha}^j$ (t) given images up to time t. The results are often not guaranteed to be smooth and may diverge over time due to error accumulation. These fundamental issues can be addressed effectively if both temporal and spatial appearance information is considered over the whole sequence at once.

To address both motion over time and location, a Fourier transform may be used in act 26. The trajectory of the landmark through the sequence is estimated as a function of a Fourier transform. Fourier components of non-linear valve motion of a heart valve are determined from the medical diagnostic imaging data. Global motion of the heart valve in the volume is removed so that the non-linear valve motion is isolated from global motion. For each Fourier component, a plurality of hypotheses is estimated.

Figure 9A:
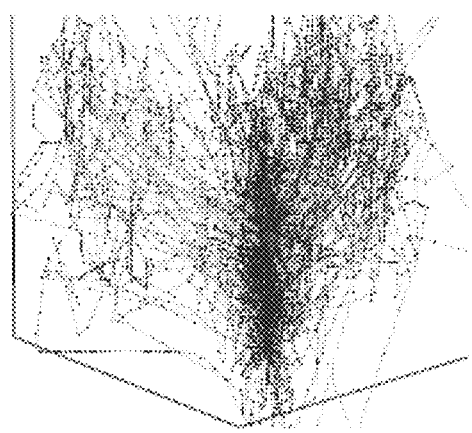
FIG. 9 is a graphical example of possible trajectories and corresponding Fourier components.
Figure 9B:
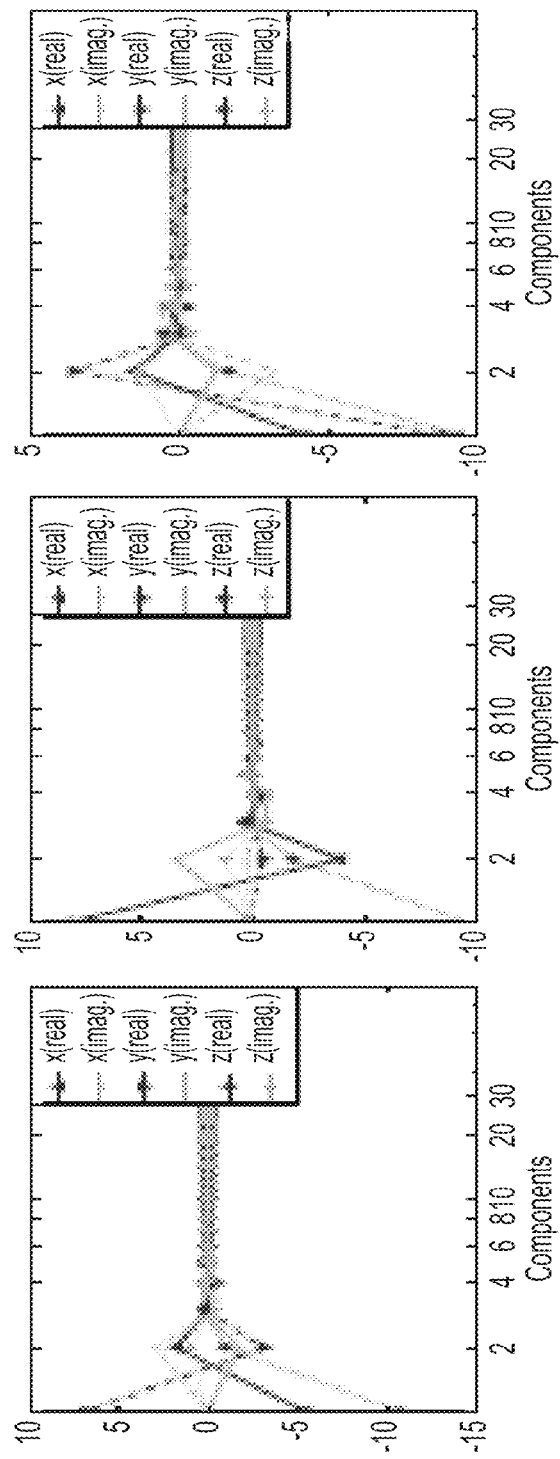

In detail, the trajectory representation $\vec{\alpha}^j$ introduced in equation 2 can be uniquely represented by the concatenation of its discrete Fourier transform (DFT) coefficients, $$\vec{s}^j = [\vec{s}^j(0), \vec{s}^j(1), \ldots, \vec{s}^j(n-1)] \quad (6)$$

obtained through the DFT equation:

$$\vec{s}^j(f) = \sum_{t=0}^{n-1} \vec{\alpha}^j(t) e^{\frac{-j2\pi tf}{n}}$$

where $\vec{s}^j(f) \in C^3$ is the frequency spectrum of the x, y, or z components of the trajectory $\vec{\alpha}^j$ (t), and f=0, 1, ..., n−1. FIG. 9 shows a plurality of possible spatial trajectories and three corresponding Fourier components. A trajectory $\vec{\alpha}^j$ can be reconstructed from the spectral coefficients $\vec{s}^j$ applying the inverse DFT:

$$\vec{\alpha}^j(t) = \sum_{f=0}^{n-1} \vec{s}^j(f) e^{\frac{j2\pi tf}{n}} \quad (7)$$

The Fourier components are inverse transformed in act 28. The inverse transforming provides trajectories of the landmark of the heart valve. The inverse transform solves for location and motion at a same time. As the results are evaluated in the real space, the estimated trajectory is obtained using the magnitude of the inverse DFT result $\vec{s}^j$. From the DFT parameterization, equation 5 can be reformulated as finding the DFT spectrum $\vec{s}^j$, with maximal posterior probability:

$$\arg\max_{\vec{s}^j} p(\vec{s}^j | I,\theta) = \arg\max_{\vec{s}^j} (\vec{s}^j(0),\ldots,\vec{s}^j(n-1) | I(0),\ldots,I(n-1),\theta(0),\ldots,\theta(n-1)) \quad (8)$$

Instead of estimating the motion trajectory directly, discriminative learning is used to detect the spectrum $\vec{s}^j$ in the frequency domain by optimizing equation 8. The DFT decomposes the trajectory space in orthogonal subspaces, which enables the estimation of each component $\vec{s}^j$ (f) separately. The DFT spectrum representation is compact, especially for periodic motion. Compact representation may allow for efficient learning and optimization. The posterior distribution is clustered in small regions, facilitating marginalization and pruning of the higher dimensional parameter spaces.

The trajectory spectrum learning and detection are performed efficiently in DFT subspaces with gradually increased dimensionality. The intuition is to perform a spectral coarse-to-fine motion estimation, where the detection of coarse level motion (low frequency) is incrementally refined with high frequency components representing fine deformations. Local-Spatio-Temporal Features (LST) features may incorporate both the spatial and temporal context.

Figure 8:
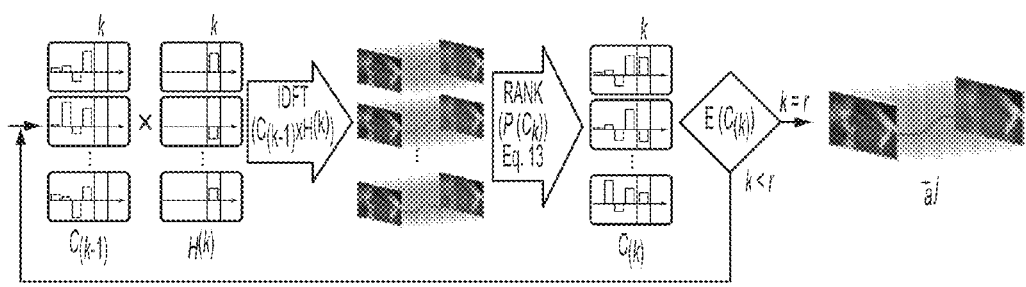
FIG. 8 is a diagram of one embodiment of spectral trajectory modeling.

FIG. 8 shows one embodiment of the trajectory spectrum learning algorithm. The stages of spectrum learning are described below. For each landmark, a number of possible trajectories is equal to the number of Fourier components included. Different numbers of possible trajectories and Fourier components may be used for different landmarks. For example, motion associated with one landmark may be less complex so only lower frequency components are used while motion for another landmark is more complex so higher frequency components are used.

Local orientation and scaling of image features may reduce ambiguity and may significantly improve learning performance. The image representation is extended by aligning contextual spatial features in time to capture four-dimensional information and support motion learning from noisy data. The 4D location of the proposed $F^{4D}()$ features is parameterized by the similarity parameters θ.

$$F^{4D}(\theta(t), T, I, s) = \tau(F^{3D}(I, \theta(t+i*s)), i=-T, \ldots, T) \quad (9)$$

Three-dimensional $F^{3D}()$ features extract simple gradient and intensity information from steerable patterns spatially align with θ(t). The similarity parameters θ are defined separately for the aortic and mitral valves, but may be defined in common. Knowing that motion is locally coherent in time, $F^{3D}()$ is applied in a temporal neighborhood t−T to t+T at discrete locations evenly distributed with respect to the current time t.

Figure 10:
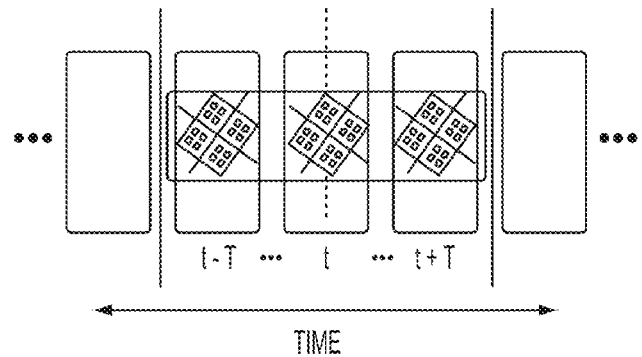
FIG. 10 illustrates an example for feature extraction in trajectory modeling.

FIG. 10 shows an example of a local-spatio-temporal feature. A window 2T wide is shown centered or aligned with a certain position, orientation and scale, at time t. The temporal context length of the illustrated LST feature is T, spanned symmetrical relative to t. The features for time t are determined by the spatial and temporal data within the window.

The final value of a Local-Spatial-Temporal (LST) feature is the result of time integration using a set of linear kernels T, which weight spatial features $F^{3D}()$ according to their distance from the current frame t. A simple example for τ is the average function over the interval [−T, T], $$\tau = 1/(2T+1)\Sigma_{i=-T}^{T}(F^{3D}(I,\theta(t+i*s))).$$

The parameter T steers the size of the temporal context, while s is a time normalization factor derived from the training set and the number of time steps of the volume sequence I. Values for T can be selected by the probabilistic boosting tree (PBT) in the training stage. Since the time window size has an inverse relationship with the motion locality, the introduced 4D local features are in consensus with a coarse-to-fine search. In one embodiment, the features with larger T values are selected to capture the lower frequency motion, and the value of T decreases for higher frequency motion components.

The space marginalization and training procedure of the trajectory estimator is learned using a machine and training data. The motion trajectory is parameterized by the DFT spectrum components $\vec{s}^j(f)$, $f=0, \ldots, n-1$. FIG. 9 shows that the variation of the spectrum components decreases substantially as the frequency increases. The example spectrum components shown in the three boxes and the possible spatial trajectories shown in the cube are for aortic leaflet tips. The cube portion of FIG. 9 shows the aligned trajectories in the Cartesian space by removing the global similarity transformations. The corresponding three trajectories demonstrate the compact spectrum representation.

Trajectories can be approximated by a few dominant components:

$$\zeta \subseteq \{0, \ldots, n-1\}, |\zeta| \ll n$$

identified during training. The obtained compact search space can be divided in a set of subspaces. Two types of subspace are provided—individual component subspaces $\Sigma^{(k)}$ and marginalized subspaces $\Sigma_k$ defined as:

$$\Sigma^{(k)} = \{\vec{s}(k)\} \quad (10)$$

$$\Sigma_k = \Sigma_{k-1} \times \Sigma^{(k)} \quad (11)$$

$$\Sigma_0 \subset \Sigma_1 \subset \ldots \subset \Sigma_{r-1}, r = |\zeta| \quad (12)$$

The subspaces $\Sigma^{(k)}$ are efficiently represented by a set of corresponding hypotheses $H^{(k)}$ obtained from the training set. The trajectories are ranked in act 30 with machine learnt probabilities. The pruned search space enables efficient learning and optimization:

$$\Sigma_{r-1} = H^{(0)} \times H^{(1)} \times \ldots \times H^{(r-1)}, r = |\zeta|$$

The training algorithm starts by learning the posterior probability distribution in the DC marginal space $\Sigma_0$. Subsequently, the learned detectors $D_0$ are applied to identify high probable candidates $C_0$ from the hypotheses) $H^{(0)}$. In the following step, the dimensionality of the space is increased by adding the next spectrum component (in this case the fundamental frequency, $\Sigma^{(1)}$). Learning is performed in the restricted space defined by the extracted high probability regions and hypotheses set $C_0 \times H^{(1)}$. The possible hypothesis determined from the prior spectrum component is used to limit the search based on the next spectrum component. The same operation is repeated until reaching the genuine search space $\Sigma_{r-1}$.

For each marginal space $\Sigma_k$, corresponding discriminative classifiers $D_k$ are trained on sets of positives $Pos_k$ and negatives $Neg_k$. Samples constructed from high probability candidates $C_{k-1}$ and hypotheses $H^{(k)}$ are analyzed. The sample set $C_{k-1} \times H^{(k)}$ is separated into positive and negative examples by comparing the corresponding trajectories to the ground truth in the spatial domain using the following distance measure:

$$d(\vec{a}_1^j, \vec{a}_2^j) = \max_t \left\| \vec{a}_1^j(t) - \vec{a}_2^j(t) \right\|$$

where $\vec{\alpha}_1^j$ and $\vec{\alpha}_2^j$ denote two trajectories for the j-th landmark. The ground truth spectrum is trimmed to the k-th component to match the dimensionality of the current marginal space $\Sigma_k$. Given the local-spatio-temporal features extracted from positive and negative positions, the probabilistic boosting tree (PBT) is applied to train a strong classifier $D_k$. The above procedure is repeated, increasing the search space dimensionality in each step, until detectors are trained for all marginal spaces $\Sigma_0, \ldots, \Sigma_{r-1}$.

For estimation using the learned probabilities, features are calculated in Euclidian space, such as the local-spatio-temporal features. The values of the features are a function of the medical diagnostic imaging data for a plurality of instances in the sequence. The features are applied to the learned detector for motion estimation from unseen (i.e., not used for training) or patient-specific data.

In one embodiment, motion estimation is provided using the spectrum associated with the possible trajectories. The detection procedure is performed for object localization and motion estimation of valve landmarks from unseen volumetric sequences. The parameter estimation is conducted in the marginalized search spaces $\Sigma_0, \ldots, \Sigma_{r-1}$ using the trained spectrum detectors $D_0, \ldots, D_{r-1}$. Starting from an initial zero-spectrum (i.e., DC spectrum), we incrementally estimate the magnitude and phase of each frequency component $\vec{s}(k)$. At the stage k shown in FIG. 8, the corresponding robust classifier $D_k$ is exhaustively scanned over the potential candidates $C_{k-1} \times H^{(k)}$. The probability of a candidate $C_k \in C_{k-1} \times H^{(k)}$ is computed by the following objective function:

$$p(C_k) = \prod_{t=0}^{n-1} D_k(IDFT(C_k), I, t) \quad (13)$$

where $t=0, \ldots, n-1$ is the time instance (i.e., frame or volume index). After each step k, the top 50 or other number of trajectory candidates $C_k$ with high probability values are preserved for the next step k+1. The set of potential candidates $C_{k+1}$ is constructed from the cross product of the candidates $C_k$ and $H^{(k+1)}$. The procedure is repeated until a final set of trajectory candidates $C_{r-1}$, defined in the full space $\Sigma_{r-1}$, is computed.

The highest ranked trajectory is selected in act 32. For example, the trajectory associated with the highest probability output after the final set of trajectory candidates are generated is selected. Other trajectories may also be selected, such as selecting all of the trajectories and combining them. In one embodiment, the final trajectory is selected as the average of all elements in $C_{r1}$, but other functions may be used. The value of r may be a function of the type of motion typical for the landmark. The selected trajectory may be used to determine the location of the landmark at any given time.

In act 34, one or more surfaces of the heart valve are estimated as a function of the estimated location of a landmark. The locations, at a given time, of a plurality of landmarks associated with a surface may be used to estimate the location of the surface.

The surfaces have a motion throughout the heart cycle as well. The surface location for each time t is estimated, providing an estimate of the motion of the surface. Each surface location is estimated independently of the location of the surface at other times. Alternatively, the location of the surface is based on a surface trajectory estimation.

The surface motion may be relative to the landmark motion. Due to mass or other characteristics of the surface, surface movement occurs relative to the landmark motion and the global valve motion. Both landmark and global valve motion may be considered in determining the surface motion. Alternatively, surface motion is determined independently of other motion.

The surface or surfaces are estimated with a comprehensive aortic-mitral model in one embodiment. A model for separate valves or only one valve may be used. In one embodiment, the full geometry of the valves is modeled using surface meshes constructed along rectangular grids of vertices. For each anatomic structure a, the underlying grid is spanned along two physiologically aligned parametric directions, $\vec{u}$ and $\vec{v}$. Each vertex $v_i^a \in \Box^3$ has four neighbors, except the edge and corner points with three and two neighbors, respectively. A rectangular grid with n×m vertices is represented by (n−1)×(m−1)×2 triangular faces. The model M at a particular time step t is uniquely defined by vertex collections of the anatomic structures. The time parameter t extends the representation for capturing valve dynamics:

$$M = \left[ \underbrace{\{\vec{v}_0^1, \ldots, \vec{v}_{N_1}^1\}}_{\text{first anatomy}}, \ldots, \underbrace{\{\vec{v}_0^n, \ldots, \vec{v}_{N_n}^n\}}_{\text{n-th anatomy}}, t \right] \quad (3)$$

where n=6, the number of represented anatomies, and $N_1 \ldots N_n$ are the numbers of vertices for a particular anatomy. The six represented structures are the aortic root, the three aortic leaflets and the two mitral leaflets, which are depicted in FIG. 5 together with their spatial relations to the above described anatomical landmarks.

Figure 5A:
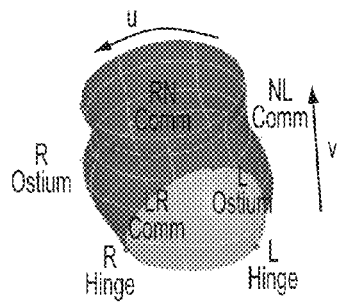
FIG. 5 illustrates example medical images of mesh or grid surfaces of a heart valve.
Figure 5B:
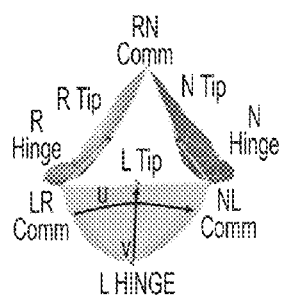
Figure 5E:
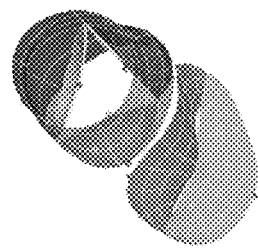
Figure 5C:
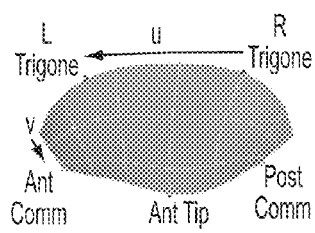
Figure 5D:
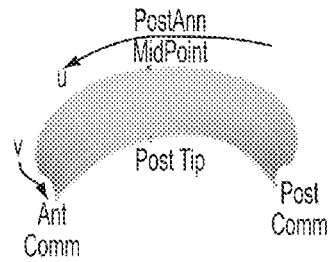
Figure 5F:
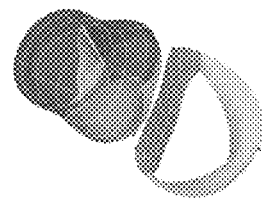

The aortic root connects the ascending aorta to the left ventricle outflow tract and is represented through a tubular grid (FIG. 5(a)). This is aligned with the aortic circumferential u and ascending directions v and includes 36×20 vertices and 1368 faces. The root is constrained by six anatomical landmarks, i.e., three commissures and three hinges, with a fixed correspondence on the grid. The three aortic leaflets, the L-, R- and N-leaflet, are modeled as paraboloids on a grid of 11×7 vertices and 120 faces (FIG. 5(b)). The aortic leaflets are stitched to the root on a crown like attachment ring, which defines the parametric μ direction at the borders. The vertex correspondence between the root and leaflets along the merging curve is symmetric and kept fixed. The leaflets are constrained by the corresponding hinges, commissures and tip landmarks, where the v direction is the ascending vector from the hinge to the tip.

The mitral leaflets separate the LA and LV hemo-dynamically and are connected to the endocardial wall by the saddle shaped mitral annulus. Both are modeled as paraboloids and their upper margins define the annulus implicitly. Their grids are aligned with the circumferential annulus direction u and the orthogonal direction v pointing from the annulus toward leaflet tips and commissures (FIGS. 5(c) and 5(d)). The anterior leaflet is constructed from 18×9 vertices and 272 faces while the posterior leaflet is represented with 24×9 vertices and 368 faces. Both leaflets are fixed by the mitral commissures and their corresponding leaflet tips. The left/right trigones and the postero-annular midpoint further confine the anterior and posterior leaflets, respectively. Other mesh or surface definitions, assumptions, or parameters may be used.

Figure 6A:
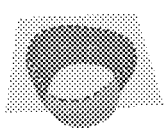
FIG. 6 shows example plane intersections of a heart valve for maintaining temporal and spatial consistency according to one embodiment.
Figure 6B:
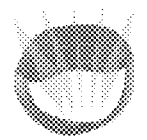
Figure 6C:
Figure 6D:
Figures 6E, 6F:
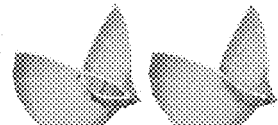

Spatial and temporal consistency is maintained. Point correspondence between the models from different cardiac phases and patients is required for building a statistical shape model. It is difficult to obtain and maintain a consistent parameterization in complex three-dimensional surfaces. Cutting planes can be applied to intersect surfaces. FIGS. 6(b), 6(c) and 6(d) show examples, but other planes, shapes, lines, or points may be used. Cutting planes may be used to generate two-dimensional contours, such as shown in FIG. 6(a). The cutting planes may be uniformly resampled using simple methods. Hence, by defining a set of physiological-based cutting planes for each model component, surfaces are consistently resampled to establish the desired point correspondence.

The mitral annulus is a saddle shaped curve and likewise the free edges are non-planar too. A rotation axis-based resampling method is applied for both mitral leaflets, as represented in examples of FIGS. 6(b) and 6(c). The intersection planes pass through the annular midpoints of the opposite leaflet. The intersection planes are rotated around the normal of the plane spanned by the commissures and the respectively used annular midpoint.

For the aortic root (see FIG. 6(d)), a pseudo parallel slice based method is used. Cutting planes are equidistantly distributed along the centerline following the v direction. To account for the bending of the aortic root, especially between the commissure and hinge level, at each location the plane normal is aligned with the centerline's tangent. The aortic leaflets are an exception as resampling along the iso-curves along their u and v directions is found to be sufficient. Other plane locations or approaches for consistent parameterization may be used.

As the model preserves point correspondence, numerical errors accumulated during the estimation process can be detected and corrected according to model constraints. For instance, during valve closure, the leaflets are touching each other, forming the leaflet-coaptation area. To ensure high quality visualization, potential intersections along the closure lines, caused by numerical errors, can be removed by averaging corresponding points within the intersection area.

Figure 11:
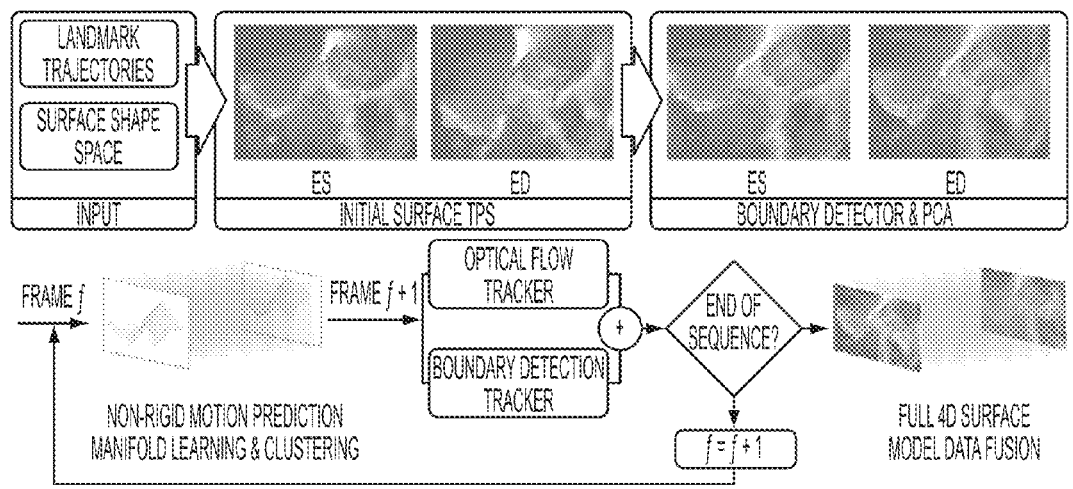
FIG. 11 shows an embodiment of estimation of surfaces.
Figure 12A:
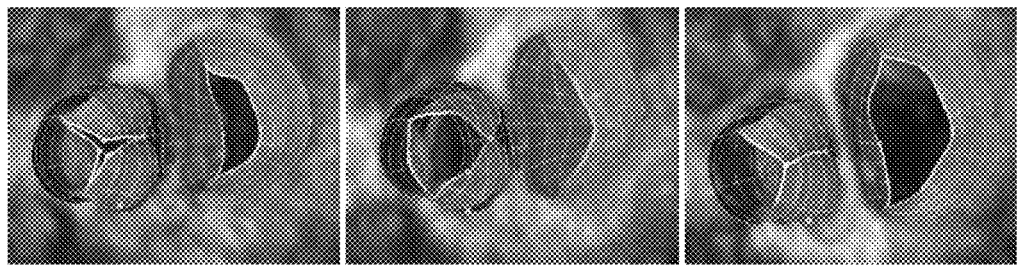
FIG. 12 shows example medical images with estimated valve overlays.
Figure 12B:
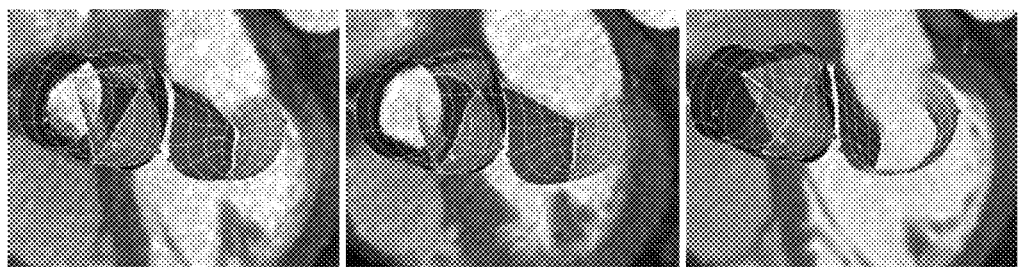
Figures 12C, 12D, 12E, 12F:
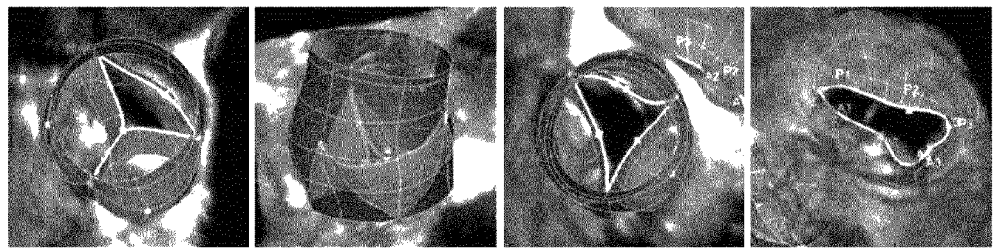
Figures 12G, 12H, 12I, 12J:
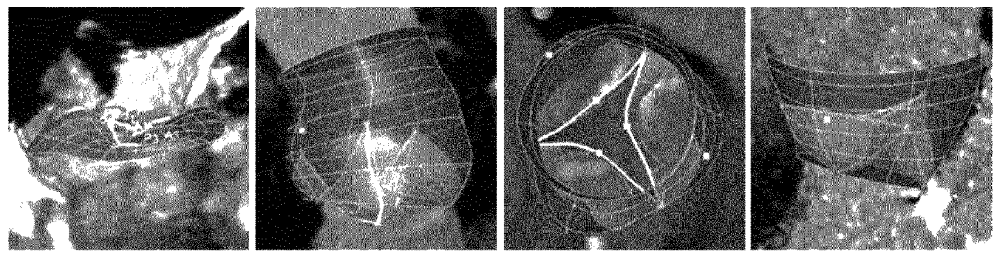

For application of the comprehensive model or surface model in the hierarchical approach, the final stage is the delineation of the full dynamic morphology of the aortic-mitral or other valve complex. The shape model is first estimated in the end-diastolic (ED) and end-systolic (ES) phases of the cardiac cycle. Then the non-rigid deformation is propagated to the remaining phases using a learned motion prior. FIG. 11 summarizes the steps for non-rigid shape estimation.

Estimation of the surfaces is performed in cardiac key phases. Given the previously detected anatomical landmarks in the ED and ES phases, a precomputed mean model of the anatomy is placed into the volumes $I(t_{ED})$ and $I(t_{ES})$ through a thin-plate-spline (TPS) transform, but other transforms may be used. In order to provide a locally accurate model estimate, a learning-based 3D boundary detection is then applied to deforming the shape to capture the anatomical and pathological variations. FIG. 11 (top) shows boundary detection to deform the shape for model estimation in cardiac key phases, end-diastole and end-systole.

For application of the surface model, a learning-based approach utilizes gradients and/or image intensities at different image resolutions for estimation. A local neighborhood is incorporated into the estimation. The features are computed using samples from a local neighborhood.

The boundary detector is trained using the probabilistic boosting-tree (PBT) on multi-scale steerable features. In testing, the boundary detector is used to evaluate a set of hypotheses, which are drawn along the normal at each of the discrete boundary points. The new boundary points are set to the hypotheses with maximal probability. The final model is obtained after projecting the estimated points to a principal component analysis (PCA) space, which covers 99.5% of the shape variation using 72 and 98 modes for the aortic and mitral valves, respectively. Other numbers of modes may be provided.

The bottom of FIG. 11 illustrates estimation in the full cardiac cycle or motion estimation. Starting from the detection results in the ED and ES phases, the model deformations are propagated in both forward and backward directions using learned motion priors. The motion prior is estimated at the training stage using motion manifold learning and hierarchical K-means clustering from a pre-annotated database of sequences containing one cardiac cycle each. Firstly, the temporal deformations are aligned by 4D generalized procrustes analysis. Next, a low-dimensional embedding is computed from the aligned training sequences using the ISOMAP algorithm to represent the highly nonlinear motion of the heart valves. Finally, in order to extract the modes of motion, the motion sequences are then clustered with hierarchical K-means based on the Euclidean distance in the lower dimensional manifold.

To ensure temporal consistency and smooth motion, and to avoid drifting and outliers, two collaborative trackers, an optical flow tracker and a boundary detection tracker, are used, but other numbers or types of trackers may be used. The optical flow tracker directly computes the temporal displacement for each point from one frame to the next. Initialized by one-step forward prediction, the detection tracker obtains the deformations in each frame with maximal probability. The results are then fused into a single estimate by averaging the computed deformations, and the procedure is repeated until the full 4D model is estimated for the complete sequence. The collaborative trackers complement each other, as the optical flow tracker provides temporally consistent results and its major issue of drifting is addressed by the boundary detection along with the one-step forward prediction.

In act 36 of FIG. 2, an image representing the heart valve is displayed. The image is a function of the surface calculated in act 34. The image may be the mesh calculated in act 34. The mesh is an outline, but other outlines, such as interconnected landmarks, may be displayed. In alternative embodiments, the image is of the landmarks and/or trajectories calculated in act 22.

In one embodiment, the estimated information is overlaid on a rendering of the heart or valves. FIG. 12 shows various examples of valve images rendered from medical data with a same scale and perspective as an outline overlaid on the rendering. Color coding or other display modulation may be used with or in addition to an overlay. For example, different surfaces of the valve are rendered from B-mode data in gray scale with color modulation specific to the surface. One surface may be rendered in one color and another in another color. Alternatively, each valve or any valve portion is displayed with modulation of the same color such that the valves are highlighted relative to other heart tissue.

One rendering or multiple renderings from the same volume may be displayed. In one embodiment, a sequence of images is displayed. The sequence is rendered from the different volumes throughout a portion or entire heart cycle. For each image in the sequence, the corresponding detected or estimated valve information is displayed. The surface corresponding to the valve at the given time represented by an image is displayed. The images of the sequence may be displayed in succession to show or represent the motion of the valves. The representation of the valve is generated as a function of the global motion, the local motion, and/or the surfaces estimated through the sequence. The trajectories are used to determine the landmark and/or surface locations through the sequence.

FIG. 12 shows examples of estimated patient-specific models from TEE and CT data. Healthy valves from three different cardiac phases in TEE from atrial aspect (FIG. 12(a)) and CT data in four chamber view (FIG. 12(b)). Example displays of images are shown for pathologic valves with bicuspid aortic valve (FIG. 12(c)), aortic root dilation and regurgitation (FIG. 12(d)), moderate aortic stenosis (FIG. 12(e)), mitral stenosis (FIG. 12(f)), mitral prolapse (FIG. 12(g)), bicuspid aortic valve with prolapsing leaflets (FIG. 12(h)), aortic stenosis with severe calcification (FIG. 12(i)) and dilated aortic root (FIG. 12(j)).

Any type of rendering of the outline and/or the view from the medical data may be used. Surface, projection or other rendering may be used. Planar reconstructions may be used.

In act 38 of FIG. 2, the valve information is used for quantification. One or more quantities are calculated from the valve representation. The surface information, landmark information, global position information, or combinations thereof are used. The estimated information may be used to identify medical image or scan data to be used for calculation. Alternatively, the estimated information itself, such as distance between landmarks or surface area, is used.

In one embodiment, the quantity is a function of information from two or more valves. One value is a function of information associated with multiple valves. The valve information is estimated independently of each other or with consideration of both valves.

The quantity may be for a given time or volume or may include temporal information. For example, the quantity is an average throughout the heart cycle or is a change between two phases of the cycle. The heart valve shape, size, or orientation may be estimated at a plurality of different times through a sequence for each of the heart valves.

In one embodiment, model-based quantification of the aortic-mitral apparatus is provided. From the estimated patient-specific model, a wide-ranging morphological and functional characterization of the aortic-mitral apparatus is provided. In comparison with quantification by manual measurements from 2D imaging, quantification from the 4D estimations may increase precision by modeling and measuring the natural three-dimensional valve anatomy, provide reproducibility through automatic quantification and avoidance of user-dependent manipulation, provide functional assessment from dynamic measurements performed over the entire cardiac-cycle, and provide comprehensive analysis including complex parameters such as shape curvatures, deformation fields and volumetric variations.

Figure 13A:
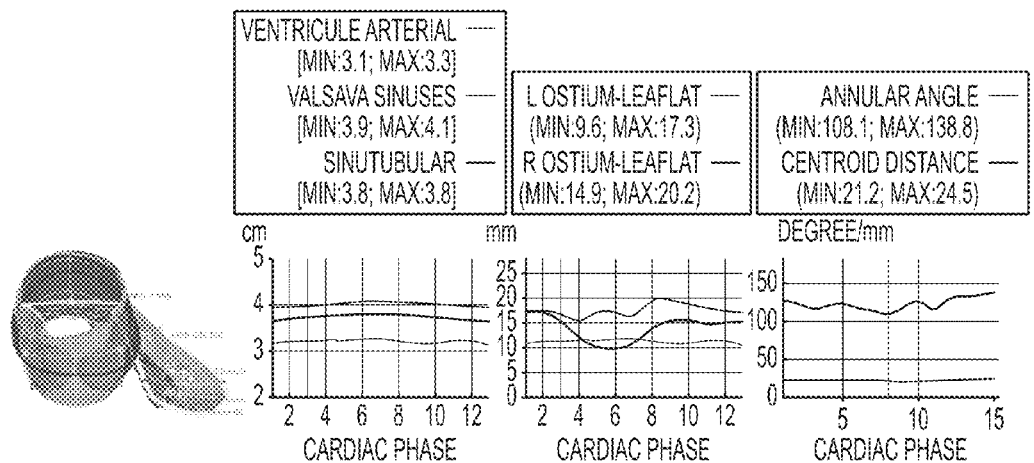
FIG. 13 illustrates example heart valve measurements with medical images.
Figure 13B:
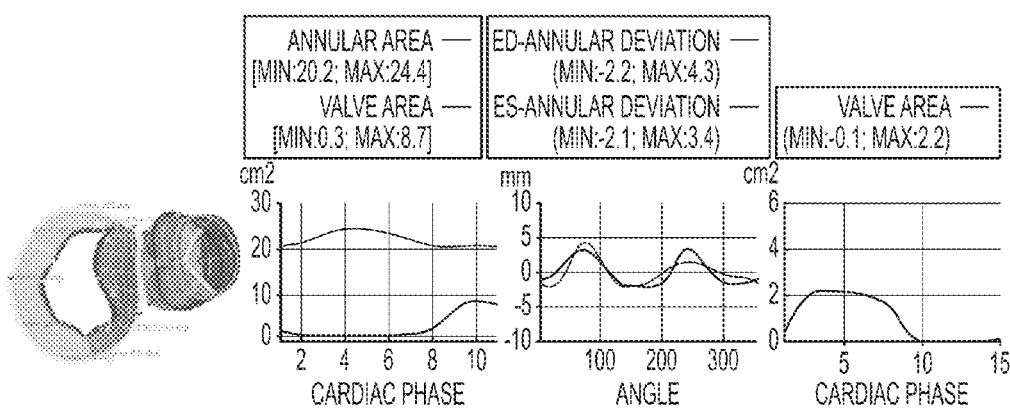

Valvular dimensions over the whole cardiac cycle facilitate accurate diagnosis and disease severity assessment. The model-driven measurements of the aortic valve area (AVA) as well as the mitral valve (MVA) and annulus area (MAA) are precisely computed from the full underlying anatomy as opposed to indirect or 2D measurements. FIG. 13 shows example quantification. In particular, examples of aortic-mitral morphological and functional measurements are shown. FIG. 13(a) shows, from left to right: aortic valve model with measurement traces, aortic valve area, aortic root diameters and ostia to leaflets distances. FIG. 13(b) shows mitral valve with measurement traces, mitral valve and annulus area, mitral annular deviation in ED and ES and aortic-mitral angle and centroid distance.

In-depth analysis of complex pathologies can be performed through independent sinuses quantization and annulo-planar deviation assessment for the aortic and mitral valves, respectively. Dimensions of the aortic root at the ventriculo-arterial junction (VAJ), sinus of valsalva (SV) and sinotubular junction (STJ) as well as the inter ostia angle are used in aortic valve replacement and repair surgery. These, along with measurements of the mitral annulus and leaflets, such as the mitral annular circumference (AC), anteroposterior diameter (APD) and anterolateral-posteromedial diameter (AL-PM-D), may be automatically computed.

Emerging percutaneous and minimally invasive valve interventions require extensive non-invasive assessment and can substantially benefit from the model-based quantification. For instance, precise knowledge of the coronary ostia position prevents hazardous ischemic complications by avoiding the potential misplacement of aortic valve implants. The estimation presents an integral three-dimensional configuration of critical structures (ostia, commissures, hinges, etc.) and calculates their relative location over the entire cardiac cycle. Additionally, the joint model characterizes the aortic-mitral interconnection by quantifying the inter-annular angle and centroid distances, which facilitates the challenging management of multi-morbid patients.

Other quantities may be calculated. The estimation may provide consistent and comprehensive positioning of any part of a valve over a desired time period, allowing calculation of any valve related quantity. Functional and morphological measurements can be efficiently performed for individual valve patients to potentially improve their clinical management.

In one embodiment, the method of FIG. 2 is performed for testing the performance of the proposed patient-specific modeling and quantification for aortic and mitral valves. Experiments are performed on a large data set. The performance of the model estimation algorithm is determined for cardiac CT and TEE volumetric sequences. The quantification performance and accuracy for the proposed system is determined.

Any data set may be used for training. In the test, functional cardiac studies are acquired using CT and TEE scanners from 134 patients affected by various cardiovascular diseases such as: bicuspid aortic valve, dilated aortic root, stenotic aortic/mitral, regurgitant aortic/mitral, and prolapsed valves. The imaging data includes 690 CT and 1516 TEE volumes, which are collected from one or more medical centers in one or more locations over any period.

Using heterogeneous imaging protocols, TEE exams are performed with Siemens Acuson Sequoia (Mountain View, Calif., USA) and Philips IE33 (Andover, Mass., USA) ultrasound machines, but other ultrasound machines may be used. TEE data includes an equal amount of rotational (3 to 5 degrees) and matrix array acquisitions. A complete cardiac cycle is captured in a series of 7 to 39 volumes, depending on the patient's heart beat rate and scanning protocol. Image resolution and size varies for the TEE data set from 0.6 to 1 mm and 136×128×112 to 160×160×120 voxels, respectively.

CT scans are acquired using Siemens Somatom Sensation or Definition scanners (Forchheim, Germany), but other CT scanners may be used. The ECG gated Cardiac CT sequences include 10 volumes per cardiac cycle, where each volume contains 80-350 slices with 153×153 to 512×512 pixels. The in-slice resolution is isotropic and varies between 0.28 to 1.00 mm with a slice thickness from 0.4 to 2.0 mm.

CT acquisitions contain both valves. The ultrasound acquisitions may also contain both valves. In some cases, the CT or ultrasound acquisitions may contain data for only one valve. For example, TEE exams may focus either on the aortic or mitral valve. In the test example, the TEE exams are only for one valve. Ten cases are annotated by four distinct users for the purpose of conducting inter-user variability study. Both CT and TEE studies from a same patient may be used.

For training the model estimators, the ground truth is obtained through an annotation process, which is guided by experts. For example, the non-rigid landmark motion model is manually determined by placing each anatomical landmark at the correct location in the entire cardiac cycle of a given study. The comprehensive aortic-mitral model is initialized through its mean model placed at the correct image location, expressed by the thin-plate-spline transform estimated from the previously annotated non-rigid landmark motion model. The ground-truth of the comprehensive aortic-mitral model is manually adjusted to delineate the true valves boundary over the entire cardiac cycle. From the annotated non-rigid landmark motion model, the global location and rigid motion model ground-truth is determined.

The machine learnt classifiers are trained using the training data. The learnt classifiers may be applied to test data. The test data has a known ground truth, such as through manual designation. The output of the estimators in the global valve position, the local landmark positions, and the surfaces.

The precision of the global location and rigid motion estimation is measured at the box corners of the detected time-dependent similarity transformation. The average Euclidean distance between the eight bounding box points, defined by the similarity transform $(c_x, c_y, c_z), (\vec{\alpha}_x, \vec{\alpha}_y, \vec{\alpha}_z) (s_x, s_y, s_z)$, and the ground-truth box is reported. To measure the accuracy of the non-rigid landmark motion estimation, detected and ground-truth trajectories of all landmarks are compared at each discrete time step using the Euclidean distance. The accuracy of the surface models obtained by the comprehensive aortic-mural estimation is evaluated by utilizing the point-to-mesh distance. For each point on a surface (mesh), the closest point (not necessarily one of the vertices) on the other surface is used to calculate the Euclidean distance. For symmetric measurement, the point-to-mesh distance is calculated in two directions, from detected to ground truth surfaces and vice versa.

The performance evaluation is conducted using three-fold cross-validation by dividing the entire dataset into three equal sized subsets, and sequentially using two sets for training and one for testing. Table I summarizes the model estimation performance averaged over the three evaluation runs. The last column represents the 80th percentile of the error values. The estimation accuracy averages at 1.54 mm and 1.36 mm for TEE and CT data, respectively. On a standard PC with a quad-core 3.2 GHz processor and 2.0 GB memory, the total computation time for the tree estimation stages is 4.8 seconds per volume (approx 120 sec for average length volume sequences), from which the global location and rigid motion estimation requires %15 of the computation time (approx 0.7 sec), non-rigid landmark motion %54 (approx 2.6 sec) and comprehensive aortic-mural estimation %31 (approx 1.5 sec). FIG. 14 shows estimation results on various pathologies for both valves and imaging modalities.

TABLE I

ERRORS FOR EACH ESTIMATION STAGE IN TEE AND CT

|  | Mean | Std. | Median | 80% |
|---|---|---|---|---|
| TEE |  |  |  |  |
| Global Location and Rigid Motion | 6.95 | 4.12 | 5.96 | 8.72 |
| Non-Rigid Landmark Motion | 3.78 | 1.55 | 3.43 | 4.85 |
| Comprehensive Aortic-Mitral | 1.54 | 1.17 | 1.16 | 1.78 |
| CT |  |  |  |  |
| Global Location and Rigid Motion | 8.09 | 3.32 | 7.57 | 10.4 |
| Non-Rigid Landmark Motion | 2.93 | 1.36 | 2.59 | 3.38 |
| Comprehensive Aortic-Mitral | 1.36 | 0.93 | 1.30 | 1.53 |

Figure 14A:
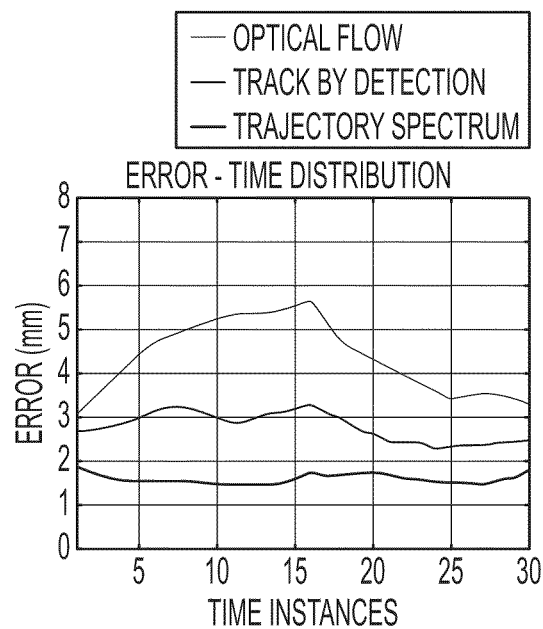
FIG. 14 shows example graphs of error comparison between valve models.
Figure 14B:
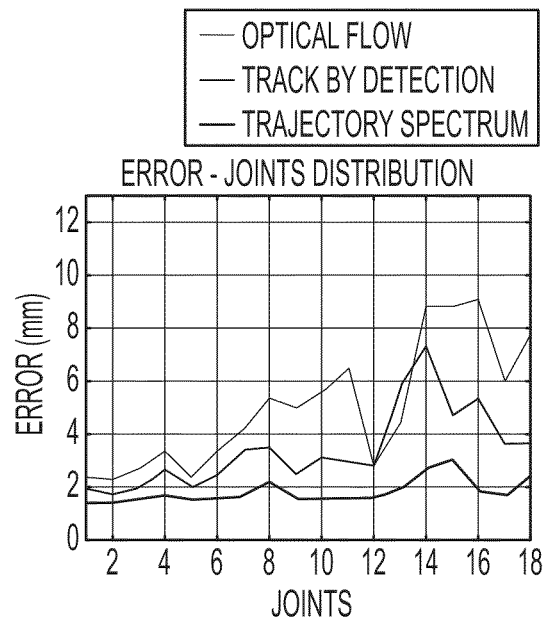

For the non-rigid landmark motion, the error distribution is compared it to optical flow and tracking-by-detection approaches. FIG. 14(a) presents the error distribution over the entire cardiac cycle, where the end-diastolic phase is at t=0. Although performed forward and backward, the optical flow approach is affected by drifting. In the same time, the tracking-by-detection error is unevenly distributed, which reflects in temporal inconsistent and noisy results. FIG. 14(b) shows the error distribution over the 18 landmarks. Both tracking-by-detection and optical flow perform significantly worse on highly mobile landmarks as the aortic leaflet tips (landmarks 9, 10 and 11) and mitral leaflet tips (landmarks 15 and 16). The proposed trajectory spectrum learning demonstrates a time consistent and model-independent precision, superior in both cases to reference methods.

Figure 15A:
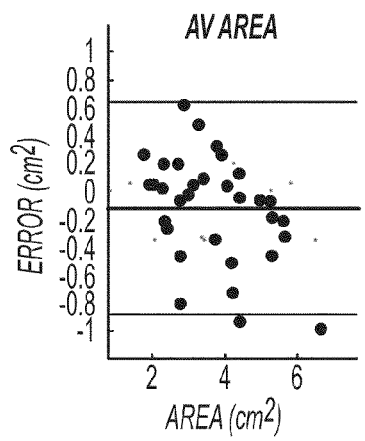
FIG. 15 is a Bland-Altman plot for valve areas in one example.
Figure 15B:
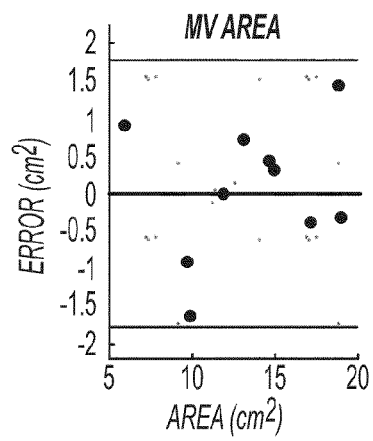

The quantification precision of the system for the measurements is evaluated in comparison to manual expert measurements. Table II shows the accuracy for the VAJ, SV and SJ aortic root diameters and AC, APD and AL-PM-D dimensions of the mitral valve. The Bland-Altman plots for the (a) aortic valve area and (b) mitral annular area in FIG. 15 demonstrate a strong agreement between manual and model-based measurements for aortic valve areas and mitral annular areas. The aortic valve experiments are performed on CT data from 36 patients, while the mitral valve experiments are evaluated on TEE data from 10 patients, based on the input of expert cardiologists.

TABLE II

SYSTEM-PRECISION FOR VARIOUS DIMENSIONS OF THE AORTIC-MITRAL APPARATUS.

|  | Mean | STD |
|---|---|---|
| VAJ (cm) | 0.137 | 0.017 |
| SV (cm) | 0.166 | 0.043 |
| STJ (cm) | 0.098 | 0.029 |
| AC (cm) | 0.846 | 0.3 |
| APD (cm) | 0.325 | 0.219 |
| AL-PM-D (cm) | 0.509 | 0.37 |

Moreover, from a subset of 19 TEE patients, measurements of the aortic-mitral complex are compared to literature reported values. Distances between the centroids of the aortic and mitral annulae as well as interannular angles are computed. The latter is the angle between the vectors, which point from the highest point of the anterior mitral annulus to the aortic and mitral annular centroids respectively. The mean interannular angle and interannular centroid distance are 137.0±12.2 and 26.5±4.2, respectively compared to 136.2±12.6 and 25.0±3.2 reported in the literature.

Based on a subgroup of patients, which underwent both, cardiac CT and TEE, an inter-modality difference may be measured. To demonstrate the consistency of the model-driven quantification, the model and measurements are created from both CT and TEE scans. The aortic valve area, inter-commissural distances, and the VAJ, SV, SJ diameters are measured for both types of data. A strong correlation $r=0.98$, $p<0.0001$ and 0.97-0.99 confidence interval may result.

Figure 16:
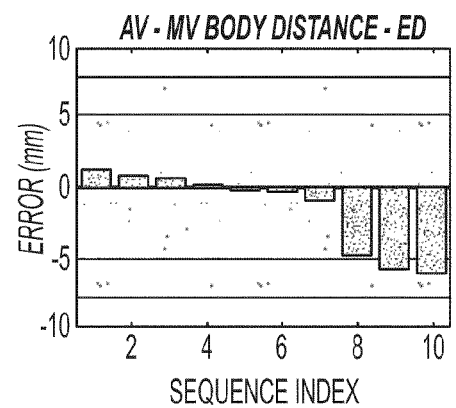
FIG. 16 shows graphs representing example errors.
Figure 16:
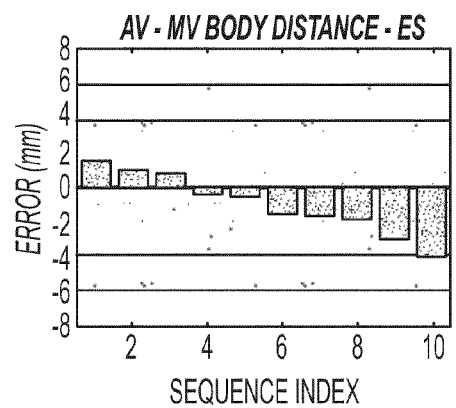
Figure 16:
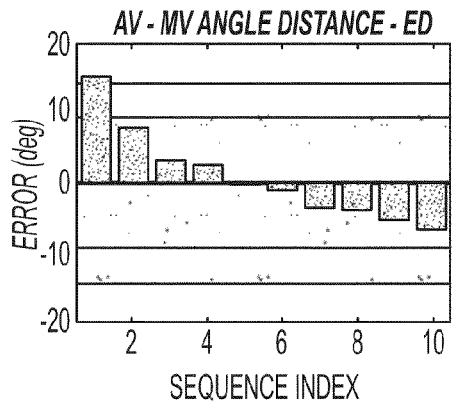
Figure 16:
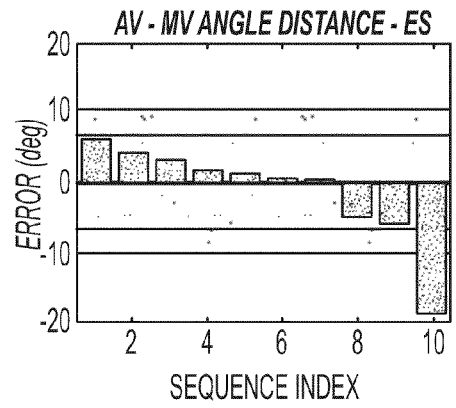

An inter-user experiment is conducted on a randomly selected subset of ten studies, which have their corresponding patient-specific valve models manually fitted by four experienced users. The inter-user variability and system error is computed on four measurements derived from both valves, i.e. the interannular angle and interannular centroid distance, performed in end-diastolic (ED) and end-systolic (ES) phases. The inter-user variability is determined by computing the standard deviation for each of the four different user measurements and subsequently averaging those to obtain the total variability. To quantify the system error, the automatic measurement result is compared to the mean of the different users. FIG. 16 shows the system-error for the selected sequences with respect to the inter-user variability. The variability is determined from the standard deviation. Note that except for 3% of the cases, the system-error lies within 90% of the inter-user confidence interval. The horizontal lines closest to 0 mm represent 80% system error. The horizontal lines furthest from 0 mm represent 90% error. The variability of measurements obtained by different users on the same data reveals feasible confidence intervals and desired precision of the automated patient-specific modeling algorithm.

Figure 17A:
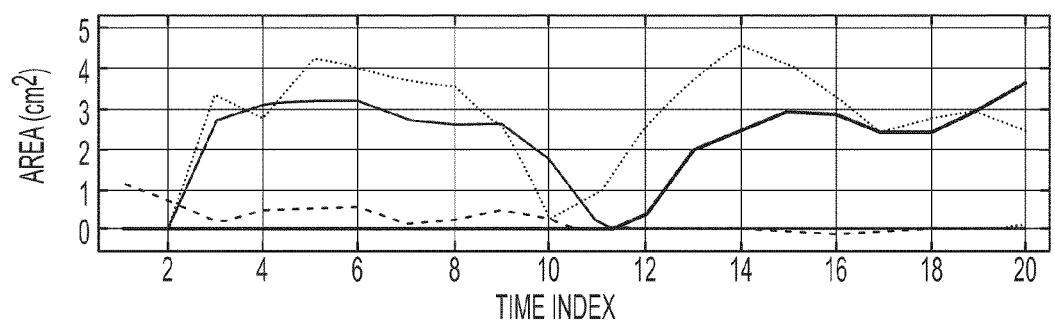
FIG. 17 shows example measurements determined before and after mitral annuloplasty.
Figure 17B:
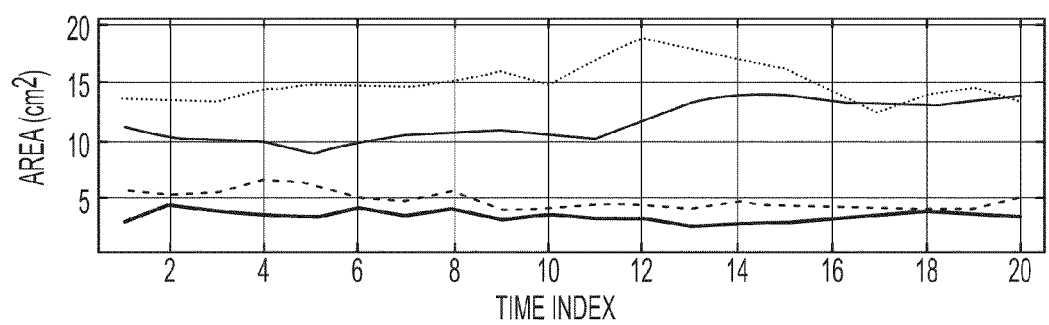

Finally, the quantification performance may be studied for a patient who undergoes a mitral annuloplasty procedure, intended to reduce mitral regurgitation. Pre- and post-TEE exams are performed before and after the successful mitral valve repair. The measurements of the mitral valve area in FIG. 17 shows measurements obtained before (dotted lines) and after (solid lines) mitral annuloplasty: (a) Aortic and Mitral valvular area, and (b) Aortic and Mitral annular area. FIG. 17(a) demonstrates the regurgitant mitral valve to be cured after procedure. Although not explicitly targeted, the intervention may have an indirect effect on the aortic valve, also illustrated in FIG. 17(b) by the annular and valvular areas. The observation concurs with clinical findings.

Figure 18:
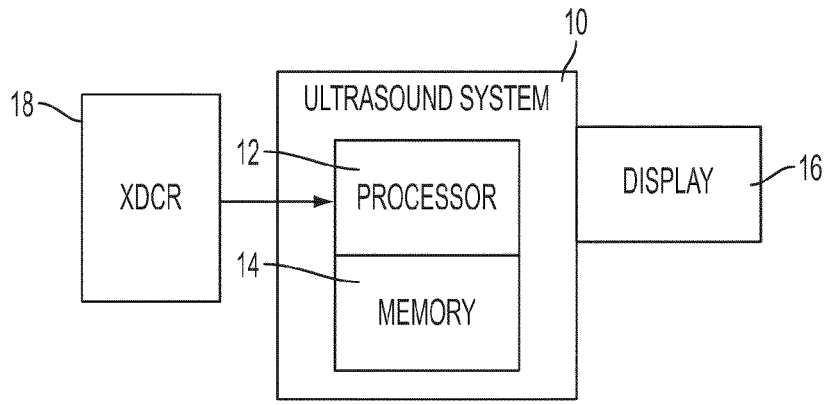
FIG. 18 is a block diagram of one embodiment of a system for assessing heart valve operation with medical diagnostic imaging data.

FIG. 18 shows a system for assessing heart valve operation with medical diagnostic ultrasound data. The system includes a transducer 18, an ultrasound scanner 10, and a display 16. The ultrasound scanner 10 includes a processor 12 and a memory 14. In alternative embodiments, the system is a CT scanner or system. Additional, different, or fewer components may be used. For example, an ultrasound scanner 10 is provided for acquiring ultrasound data representing a volume, and a separate database, server, workstation, and/or computer is provided for estimating, display of estimate overlay information, and quantification.

The ultrasound scanner 10 includes a transmit beamformer, receive beamformer, B-mode detector, Doppler detector, harmonic response detector, contrast agent detector, scan converter, filter, combinations thereof, or other now known or later developed medical diagnostic ultrasound system components. As another example, the transducer 18 is not provided, such as where the system is a workstation for off-line or later measurement of valve anatomy.

The transducer 18 is a piezoelectric or capacitive device operable to convert between acoustic and electrical energy. The transducer 18 is an array of elements, such as a multi-dimensional or two-dimensional array. Alternatively, the transducer 18 is a wobbler for mechanical scanning in one dimension and electrical scanning in another dimension. In another embodiment, the array is a one-dimensional array on a cardiac catheter or a TEE probe.

The ultrasound scanner 10 uses the transducer 18 to scan a heart volume of a patient. Electrical and/or mechanical steering allows transmission and reception along different scan lines in the volume. Any scan pattern may be used. For example, a plurality of different planes through the heart is scanned by rotating a TEE array, moving a catheter array, or volume scanning with a matrix array. In one embodiment, the transmit beam is wide enough for reception along a plurality of scan lines. In another embodiment, a plane, collimated or diverging transmit waveform is provided for reception along a plurality, large number, or all scan lines.

The scan provides the medical diagnostic ultrasound data representing the heart volume at different times as a sequence. The scan is repeated to provide data for the volume at different times. Ultrasound data representing a volume is provided in response to the scanning. The ultrasound data is beamformed, detected, and/or scan converted. The ultrasound data may be in any format, such as polar coordinate, Cartesian coordinate, a three-dimensional grid, two-dimensional planes in Cartesian coordinate with polar coordinate spacing between planes, or other format. The ultrasound data may be of any type, such as B-mode, flow mode, Doppler mode, contrast agent, harmonic, or other ultrasound modes of imaging.

The memory 14 is a buffer, cache, RAM, removable media, hard drive, magnetic, optical, database, or other now known or later developed memory. The memory 14 is a single device or group of two or more devices. The memory 14 is shown within the system 10, but may be outside or remote from other components of the system 10.

The memory 14 stores the ultrasound data, such as ultrasound data representing a heart volume at different times in a heart cycle. The heart volume including at least one valve, but other portions of the heart may be represented. The memory 14 stores flow (e.g., velocity, energy or both) and/or B-mode ultrasound data. Alternatively, the medical image data is transferred to the processor 12 from another device. The medical image ultrasound data is a three-dimensional data set, or a sequence of such sets. The data represents a three-dimensional region. Any format may be used, such as voxels interpolated to a three-dimensional grid or data representing parallel or non-parallel planes.

For real-time imaging, the ultrasound data bypasses the memory 14, is temporarily stored in the memory 14, or is loaded from the memory 14. Real-time imaging may allow delay of a fraction of seconds, or even seconds, between acquisition of data and imaging with measurements. For example, real-time imaging is provided by generating the images substantially simultaneously with the acquisition of the data by scanning. While scanning to acquire a next or subsequent set of data, images and measurements are generated for a previous set of data. The imaging occurs during the same imaging session used to acquire the data. The amount of delay between acquisition and imaging for real-time operation may vary, such as a greater delay for initially locating valve anatomies with less delay for measurements. In alternative embodiments, the ultrasound data is stored in the memory 14 from a previous imaging session and used for measuring and/or generating a planar reconstruction without concurrent acquisition.

The memory 14 is additionally or alternatively a computer readable storage medium with processing instructions. The memory 14 stores data representing instructions executable by the programmed processor 12 for assessing heart valve operation with medical diagnostic imaging data. The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The processor 12 is a general processor, digital signal processor, three-dimensional data processor, graphics processing unit, application specific integrated circuit, field programmable gate array, digital circuit, analog circuit, combinations thereof, or other now known or later developed device for processing medical image data. The processor 12 is a single device, a plurality of devices, or a network. For more than one device, parallel or sequential division of processing may be used. Different devices making up the processor 12 may perform different functions, such as an automated anatomy detector and a separate device for performing measurements associated with the detected anatomy. In one embodiment, the processor 12 is a control processor or other processor of a medical diagnostic imaging system, such as a medical diagnostic ultrasound imaging system processor. The processor 12 operates pursuant to stored instructions to perform various acts described herein, such as obtaining data, detecting anatomy, measuring anatomy, and/or controlling imaging.

The processor 12 is configured to detect valve motion. The valve motion is passive motion. The valve operates in response to movement of the heart and includes little active muscle movement. The valve motion is detected as a function of application of the medical diagnostic imaging data to a machine-learnt probabilistic model. The valve motion in represented in the sequence from the medical diagnostic imaging data. The detection occurs during a scan of a patient for feedback while the patient is being scanned or at the medical facility. Detection may occur at other times.

In one embodiment, the processor 12 is configured to detect the valve motion by simultaneously solving for location and motion of a landmark. The spectral trajectory model is applied as a machine-learnt probabilistic model. The landmark location may be estimated without other estimation. In another embodiment, a hierarchal model is used by the processor 12 to estimate global motion assuming a rigid heart valve, then non-linear motion of landmarks of the heart valve, and then a surface of the heart valve.

The processor 12 may performs machine learning and/or applies a machine-learnt algorithm. For example, the processor 12 applies a probabilistic model to detect valve anatomy. The probabilistic model is a machine-learned classifier. Any classifier may be applied, such as a model-based classifier or a learned classifier (e.g., classifier based on machine learning). For learned classifiers, binary or multi-class classifiers may be used, such as Bayesian or neural network classifiers. The classifier is instructions, a matrix, a learned code, or other software and/or hardware for distinguishing between information in a medical image.

The classifier may include a plurality of models or classifiers (e.g., detectors) operable together or independently. For example, different probabilistic models are trained for different anatomy or types of motion. The probabilistic models may be joint or dependent. The location of other anatomies is used to limit or define a search space for a current anatomy and/or as a feature input for classification of another anatomy.

The different classifiers for joint classification, marginal space classification, and/or multiple resolution classification are the same or different types of classifiers. The same or different types of classifiers may be used for the same type of classification, such as different types of classifiers being used for different marginal space classification (e.g., the classifier for global motion is different than the classifier for surface location).

In one embodiment, the probabilistic model is formed from a plurality of probabilistic boosting tree classifiers. Separate training and resulting machine-trained classifiers are provided for each type of motion of interest. For each of these separate classifiers, separate probabilistic boosting tree classifiers are provided for each of the marginal space types. For example, the classifiers follow the marginal space learning protocol.

For application, the processor 12 calculates features for classification. The same or different features are used for classification in each stage. Using a machine-trained translation classifier, the features are used to rule out hypotheses, leaving a subset of remaining hypotheses.

The features are three-dimensional features. 3D data is used to calculate the features. The window function defining the data is a cube, but may have other volume shapes. The window is translated, rotated, and scaled as part of searching for an anatomy. The same or different sized windows are used for different anatomies.

Any features may be used. Different types of features may be used for the same classifier, or all of the features are of a same type for a given classifier. In one embodiment, Haar wavelet-like and/or steerable features are calculated. Haar wavelet-like features represent the difference between different portions of a region. Any number of features may be used, such as tens, hundreds, or thousands. The machine learning process may operate to determine a desired subset or set of features to be used for a given classification task. In one embodiment, the type of features used is gradient features. For example, the "steerable" features described by Zheng, et al. in "Fast Automatic Heart Chamber Segmentation from 3D CT Data Using Marginal Space Learning and Steerable Features," Proc. Intl Conf. on Computer Vision, pp. 1-8, 2007, are used. Other types of features may alternatively or additionally be used.

The processor 12 is configured to use the estimates. For example, a display is generated of the valve operation over time. As another example, a quantity is calculated and output on the image display, as a number or as part of a graph. Any quantity may be calculated, such as a quantity representing a characteristic of the valve motion. In one embodiment, the quantity is a function of information for two heart valves.

In one embodiment, the classifier is trained with measurement annotations, such as caliper positions. The detection of the anatomy provides the caliper positions as an output of the classifier. The measurement corresponding to the caliper position is performed, such as measuring a diameter or distance.

The display 16 is a CRT, LCD, plasma, projector, printer, or other output device for showing an image. The display 16 displays an image of the detected anatomy, such as an image of a valve rendered from medical data and overlaid or highlighted based on the estimates of the valve position. The display 16 displays a sequence of renderings to generate a visualization of the valve motion through the sequence. The visualization for one time or a sequence may be generated during a same examination session as the scan. The detected anatomy may or may not be segmented, such as just displaying the valve. Alternatively or additionally, a value of the measurement is displayed. The value may be displayed in a chart, graph, and/or on an image.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for assessing heart valve operation with medical diagnostic imaging data, the method comprising:
   automatically determining, by a processor, a first location of a heart valve from application of the medical diagnostic imaging data to a global location model, the first location being determined as a global heart valve position of the overall heart valve within a volume represented by the medical diagnostic imaging data;
   determining, by the processor, a second location of an anatomical landmark of the heart valve relative to the heart valve, the determining of the second location being a function of the determined first location of the global heart valve position;
   determining, by the processor, a surface of the heart valve as a function of the determined second location of the landmark, the surface representing a geometry of the heart valve itself; and
   displaying an image representing the heart valve, the image being a function of the surface.

2. The method of claim 1 wherein determining the first location, determining the second location, and determining the surface are performed with separate machine learnt algorithms, the separate machine learnt algorithms comprising statistical models.

3. The method of claim 1 wherein determining the first location comprises determining a rigid, global motion of the heart valve without consideration of non-rigid, localized motion of the heart valve, wherein determining the second location comprises determining a non-rigid, local motion of the heart valve with the medical diagnostic imaging data, and wherein determining the surface comprises determining motion of the surface relative to the non-rigid, local motion.

4. The method of claim 1 wherein determining the second location comprises determining a trajectory of the landmark through a sequence as a function of a Fourier transform.

5. The method of claim 1 wherein displaying comprises displaying an outline representing the surface on the image, the image generated as a function of ultrasound, computed tomography or ultrasound and computer tomography data.

6. The method of claim 1 wherein the heart valve is a mitral valve, and further comprising:
   performing the three determining acts for an aortic valve, the determining for the aortic valve being independent of the determining for the mitral valve; and
   outputting a quantity as a function of information for both the mitral and aortic valve.

7. The method of claim 1 wherein displaying comprises displaying a sequence of images, including the image, representing the heart valve through a cardiac cycle, the determining acts performed for the sequence, the images of the sequence each being a function of the surface corresponding to a same time of the cardiac cycle as the image, wherein the determining and displaying occur during a scanning session of a patient.

8. The method of claim 1 wherein the automatically determining the first location comprises detecting from computed tomography data as the medical diagnostic imaging data.

9. The method of claim 1 wherein determining the second location comprises simultaneously solving for the second location and motion of the landmark with a spectral trajectory model.

10. A system for assessing heart valve operation with medical diagnostic ultrasound data, the system comprising:
- an ultrasound scanner configured to scan a heart volume of a patient, the scan providing the medical diagnostic ultrasound data representing the heart volume at different times as a sequence;
- a processor configured to detect, as a function of application of the medical diagnostic imaging data to a machine-learnt probabilistic model, valve motion in the sequence as a parameterization from the medical diagnostic imaging data, the valve motion being passive motion of a geometric portion of the heart valve, the detection occurring during the scan, the processor configured to use the parameterization as a value derived from a difference in the heart valve at different times in the sequence;
- a display configured to generate a visualization of the valve motion through the sequence, the visualization generated during a same examination session as the scan.

11. The system of claim 10 wherein the processor is configured to detect the valve motion by simultaneously solving for location and motion of a landmark with a spectral trajectory model as the machine-learnt probabilistic model.

12. The system of claim 10 wherein the processor is configured to calculate a quantity representing a characteristic of the valve motion from the detected valve motion.

13. The system of claim 12 wherein the quantity is a function of information for two heart valves.

14. The system of claim 10 wherein the processor is configured to detect with a hierarchal model estimating global motion assuming a rigid heart valve, then non-linear motion of landmarks of the heart valve, and then a surface of the heart valve.

15. The system of claim 10 wherein the processor is configured to detect based on a first location of the heart valve determined from application of the medical diagnostic imaging data to a global location model, the first location being determined as a global heart valve position of the overall heart valve within the heart volume, based on a second location of an anatomical landmark of the heart valve determined relative to the heart valve, the second location determined as a function of the determined first location of the global heart valve position, and based on a surface of the heart valve determined as a function of the determined second location of the landmark, the surface representing a geometry of the heart valve itself.

16. A method for assessing heart valve operation with medical diagnostic imaging data, the method comprising:
- for parameterizing motion of both aortic and mitral valves:
    - automatically determining, with a processor, a first location of a heart valve from application of the medical diagnostic imaging data to a global location model, the first location being determined as a global heart valve position of the overall heart valve within a volume represented by the medical diagnostic imaging data, and the global location model being a first machine-trained statistical classifier;
    - determining, with the processor applying a second machine-trained statistical classifier, a second location of an anatomical landmark of the heart valve relative to the heart valve, the determining of the second location being a function of the determined first location of the global heart valve position;
    - determining, with the processor applying a third machine-trained statistical classifier, a surface of the heart valve as a function of the determined second location of the landmark, the surface representing a geometry of the heart valve itself;
- performing morphological quantification of a valve as a function of the motion of the surfaces of both the aortic and mitral valves, the performing comprising calculating a geometric value characterizing the valve; and
- displaying an image, the image being a function of the geometric value.

* * * * *